(12) United States Patent
Namizuka et al.

(10) Patent No.: US 7,580,651 B2
(45) Date of Patent: Aug. 25, 2009

(54) IMAGE FORMING APPARATUS AND METHOD OF CONTROLLING ENERGY SAVING MODE

(75) Inventors: Yoshiyuki Namizuka, Kanagawa (JP); Hiroshi Hosaka, Tokyo (JP); Keiichiroh Katoh, Kanagawa (JP); Mitsuhisa Kanaya, Tokyo (JP); Yuji Takahashi, Kanagawa (JP); Fumio Kawamura, Kanagawa (JP); Jun Doi, Kanagawa (JP); Masayoshi Miyamoto, Kanagawa (JP); Tetsuya Kawaguchi, Kanagawa (JP); Hiroshi Soga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 24 days.

(21) Appl. No.: 11/129,338

(22) Filed: May 16, 2005

(65) Prior Publication Data
US 2005/0271410 A1  Dec. 8, 2005

(30) Foreign Application Priority Data

May 19, 2004 (JP) .............................. 2004-149269
May 6, 2005 (JP) .............................. 2005-135421

(51) Int. Cl.
*G03G 21/00* (2006.01)
*G03G 15/00* (2006.01)

(52) U.S. Cl. ........................................ 399/75; 399/407
(58) Field of Classification Search ................... 399/75, 399/79, 80, 83, 407
See application file for complete search history.

(56) References Cited

U.S. PATENT DOCUMENTS 7,171,135 B2 *  1/2007  Nishizawa et al. ............ 399/70

2001/0000027 A1  3/2001  Collard et al.
2002/0171861 A1  11/2002  Katsuragi
2003/0053111 A1  3/2003  Endo
2003/0142990 A1 *  7/2003  Weaver .......................... 399/80
2003/0160999 A1  8/2003  Namizuka
2004/0081479 A1 *  4/2004  Kobayashi et al. ............. 399/80
2004/0233467 A1  11/2004  Namizuka
2005/0047812 A1 *  3/2005  Takemura ...................... 399/75
2005/0123316 A1 *  6/2005  Hirano ........................... 399/80
2006/0251442 A1 *  11/2006  Fuqua et al. ................... 399/80

FOREIGN PATENT DOCUMENTS

| EP | 0585 075 A1 | 3/1994 |
|---|---|---|
| JP | 2002174988 A * | 6/2002 |
| JP | 2002-320061 A | 10/2002 |

OTHER PUBLICATIONS

Patent Abstracts of Japan, JP 2002-174988, Jun. 21, 2002.
Patent Abstracts of Japan, JP 11-175225, Jul. 2, 1999.

* cited by examiner

*Primary Examiner*—David M Gray
*Assistant Examiner*—Joseph S Wong
(74) *Attorney, Agent, or Firm*—Oblon, Spivak, McClelland, Maier & Neustadt, P.C.

(57) ABSTRACT

A method of controlling an energy saving mode in an image forming apparatus having hardware resources used in an image forming process and programs for performing the image forming process includes a step of letting the image forming apparatus enter into an energy saving mode in a standby state in which the image forming apparatus is not used, and a step of recovering at least part of functions of the image forming apparatus in response to setting of a data carrier in the image forming apparatus, said data carrier being in a possession of an operator.

46 Claims, 36 Drawing Sheets

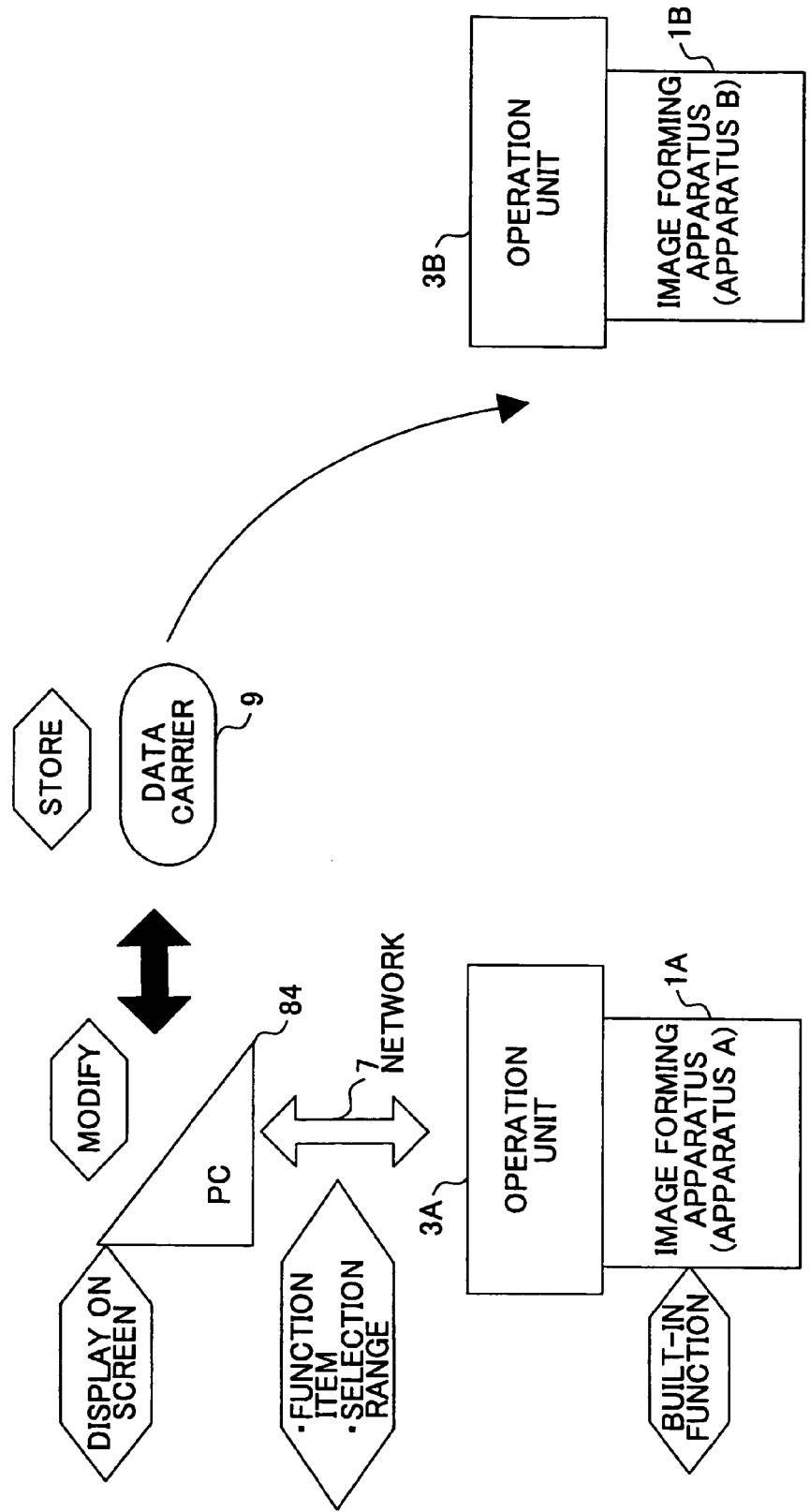

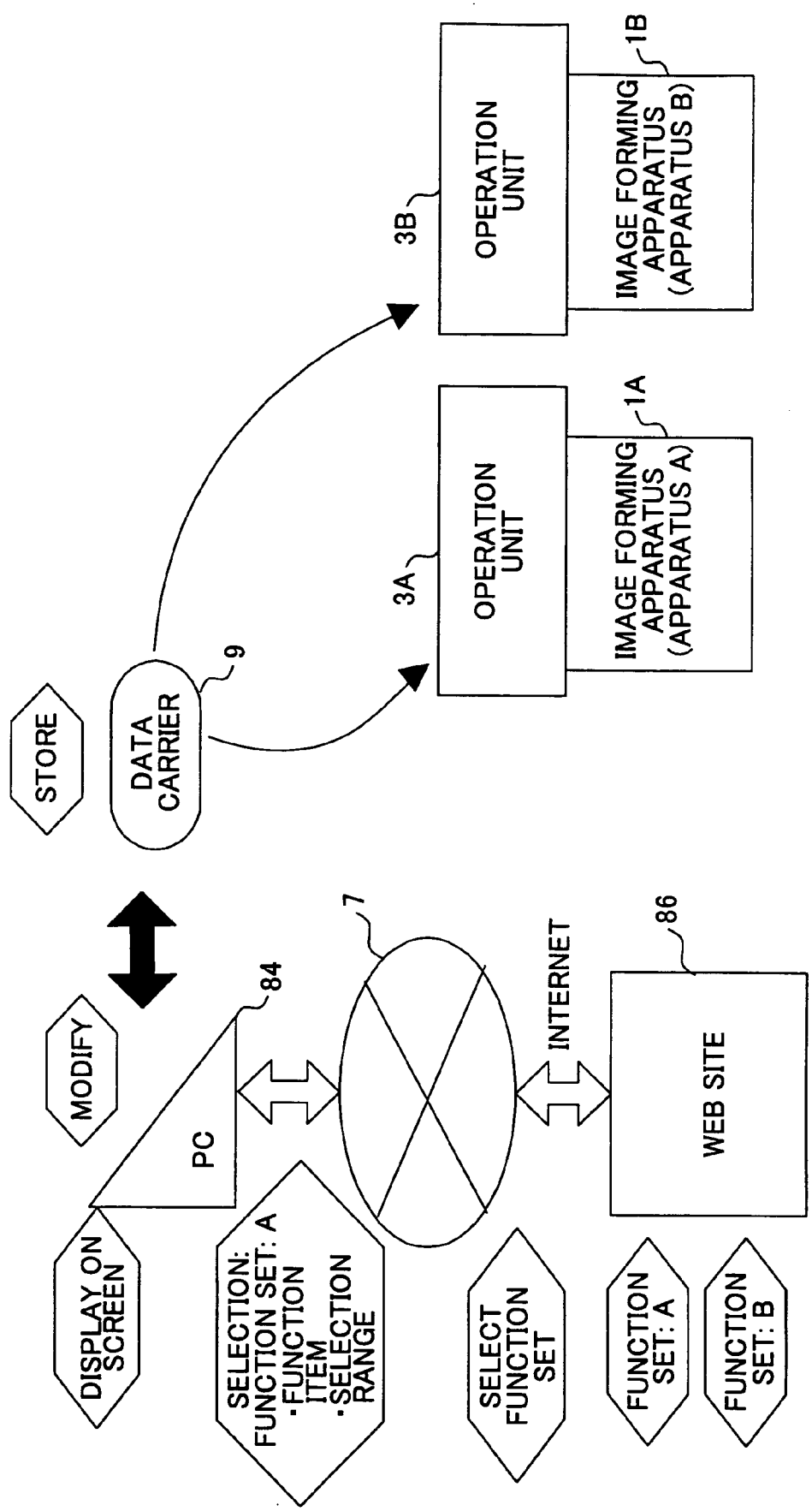

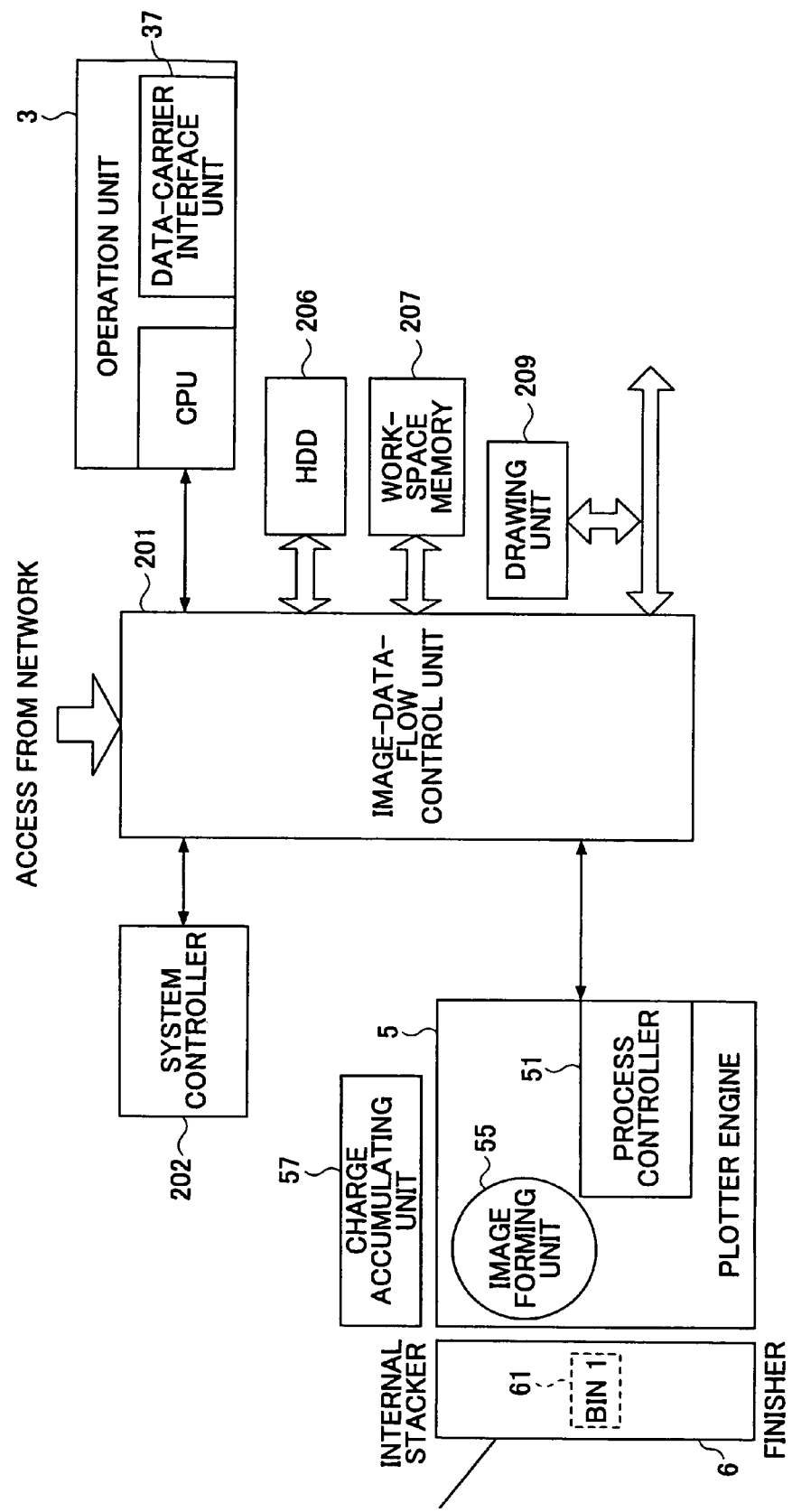

IMAGE FORMING APPARATUS AND METHOD OF CONTROLLING ENERGY SAVING MODE

BACKGROUND OF THE INVENTION

1. Field of the Invention

The present invention relates to a method of controlling an energy saving mode of an image forming apparatus.

2. Description of the Related Art

Image forming apparatuses typified by copier machines are generally kept in a powered-on state, which naturally results in a pronounced need for reduction in power consumption. In recent years, many types of image forming apparatuses have been provided with the function to serve as a network-based printer, and are thus kept in a powered-on state even during the night. A need for reduction in power consumption is thus particularly strong for such image forming apparatuses.

Against this background, conventionally, image forming apparatuses are configured to automatically enter into an energy saving mode (power-save mode) when the image forming apparatuses are put into a standby state in which they are not used. Such an energy saving mode is cancelled by key entering or the like by an operator.

As described above, the related-art image forming apparatuses automatically enter into an energy saving mode upon entry into a standby state where they are not used, and the energy saving mode is cancelled by key entering or the like by an operator. Such canceling and return to a normal mode recover all the functions without discriminating any of these functions, which thus gives rise to a problem in that the effect of energy saving is not sufficient.

In order to allow energy saving to be fully effective, it is desired to stop the supply of power to each unit as long as possible. If key entering or the like by an operator triggers the recovery of all the functions, however, the units that are not necessary may also be powered on. In such a case, an effect of energy saving is not utilized to the fullest extent.

On the other hand, through utilization of an energy saving effect to an extreme extent may result in lesser convenience for the operator when using the apparatuses. It is thus desired to provide a control method that fits with the usage situations.

Accordingly, there is a need for a method of controlling an energy saving mode of an image forming apparatus which provides a sufficient energy saving effect without undermining convenience of use for the operator.

SUMMARY OF THE INVENTION

It is a general object of the present invention to provide a method of controlling an energy saving mode that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a method of controlling an energy saving mode particularly pointed out in the specification in such full, clear, concise, and exact terms as to enable a person having ordinary skill in the art to practice the invention.

To achieve these and other advantages in accordance with the purpose of the invention, the invention provides a method of controlling an energy saving mode in an image forming apparatus having hardware resources used in an image forming process and programs for performing the image forming process. The method includes a step of letting the image forming apparatus enter into an energy saving mode in a standby state in which the image forming apparatus is not used, and a step of recovering at least part of functions of the image forming apparatus in response to setting of a data carrier in the image forming apparatus, said data carrier being in a possession of an operator.

According to another aspect of the present invention, the data carrier is coupled to the image forming apparatus through an off-line connection.

According to another aspect of the present invention, the data carrier is coupled to the image forming apparatus through a wireless connection.

According to another aspect of the present invention, part of the functions for receiving a command and a job through a network is maintained in an activated state in the energy saving mode.

According to another aspect of the present invention, the method as described above further includes a step of storing print data when receiving a print job.

According to another aspect of the present invention, the method as described above further includes a step of recovering a hard disk drive from an inactive state to store the print data when receiving the print job.

According to another aspect of the present invention, the method as described above further includes a step of recovering a print function to perform printing in response to the setting of the data carrier in the image forming apparatus.

According to another aspect of the present invention, the method as described above further includes a step of discharging electric charge from a charge accumulating unit at a time of recovering the print function.

According to another aspect of the present invention, the method as described above further includes a step of charging the charge accumulating unit while the image forming apparatus is in an activated state.

According to another aspect of the present invention, the charge accumulating unit includes a condenser or a secondary battery.

According to another aspect of the present invention, the method as described above further includes a step of recovering a print function to perform printing when receiving a print job, and a step of storing a printed sheet in storage such that the printed sheet is not accessible.

According to another aspect of the present invention, the method as described above further includes a step of storing the printed sheet in an internal stacker.

According to another aspect of the present invention, the internal stacker include a plurality of bins each serving as storage.

According to another aspect of the present invention, the method as described above further includes a step of entering into the energy saving mode again after storing the printed sheet.

According to another aspect of the present invention, the method as described above further includes a step of allowing the printed sheet to be accessible in response to the setting of the data carrier in the image forming apparatus.

According to another aspect of the present invention, the method as described above further includes a step of recovering a function of the internal stacker so as to allow the printed sheet to be accessible in response to the setting of the data carrier in the image forming apparatus.

According to another aspect of the present invention, the method as described above further includes a step of discharging electric charge from a charge accumulating unit at a time of recovering the print function.

According to another aspect of the present invention, the method as described above further includes a step of charging the charge accumulating unit while the image forming apparatus is in an activated state.

According to another aspect of the present invention, the charge accumulating unit includes a condenser or a secondary battery.

According to another aspect of the present invention, said step of recovering recovers all the functions of the image forming apparatus in response to the setting of the data carrier in the image forming apparatus.

According to another aspect of the present invention, the method as described above further includes a step of identifying the operator who possesses the data carrier based on an information content of the data carrier, wherein said step of recovering recovers only one or more of the functions usable according to usage right of the identified operator.

According to another aspect of the present invention, further, an image forming apparatus corresponding to the method described above is provided.

According to at least one embodiment of the present invention, minimum necessary functions are recovered in response to the setting in the image forming apparatus of the data carrier that is in the possession of the operator. This achieves a sufficient energy saving effect without undermining convenience of use when the operator uses the apparatus.

BRIEF DESCRIPTION OF THE DRAWINGS

Other objects and further features of the present invention will be apparent from the following detailed description when read in conjunction with the accompanying drawings, in which:

FIGS. 20A through 20C are illustrative drawings showing the outline of editing of the data carrier;

FIGS. 28A through 28C are drawings showing the outline of another example of control of an energy saving mode based on the data carrier;

DESCRIPTION OF THE PREFERRED EMBODIMENTS

In the following, embodiments of the present invention will be described with reference to the accompanying drawings.

Figure 1:
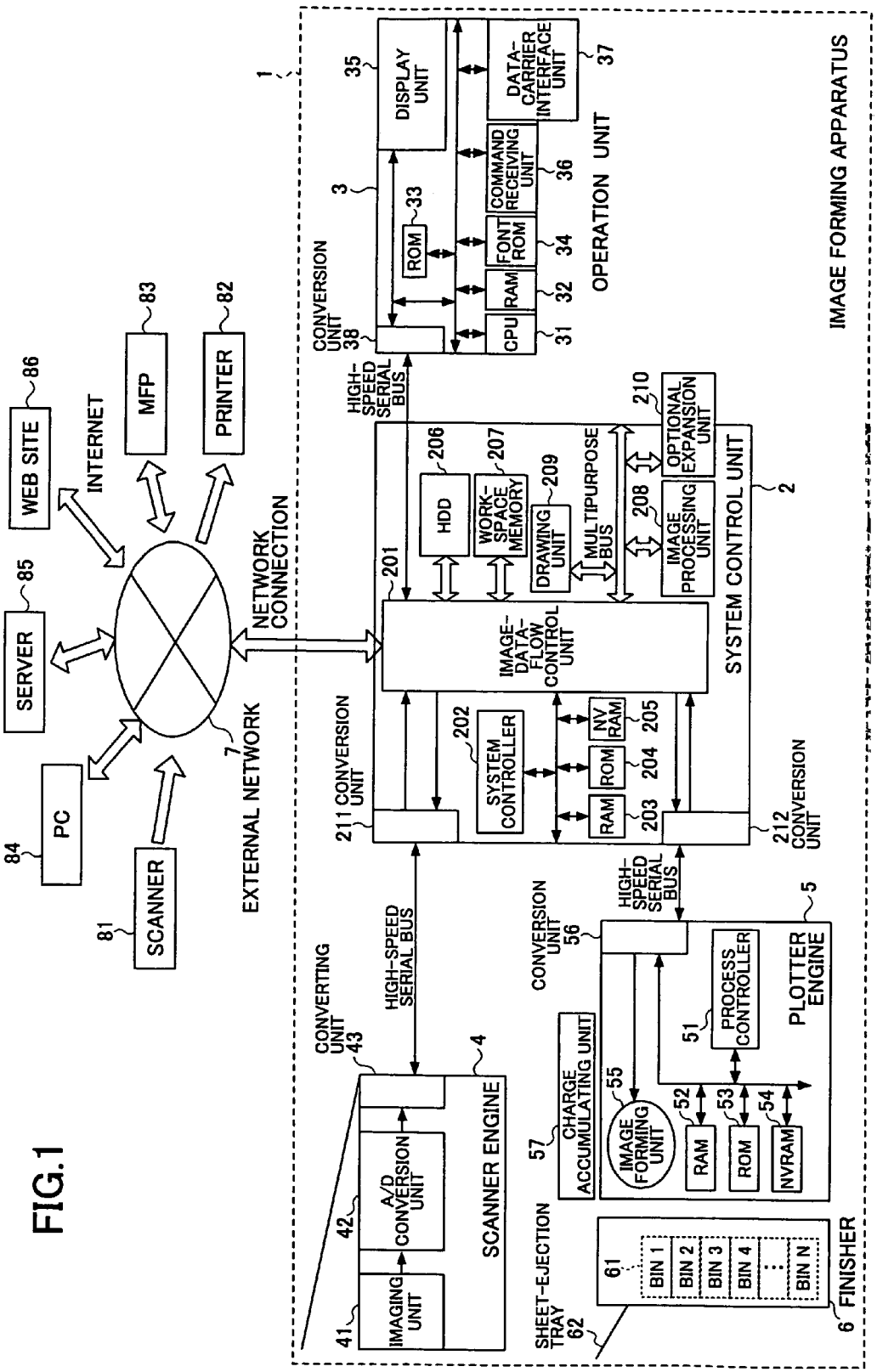
FIG. 1 is a block diagram showing an image forming apparatus according an embodiment of the present invention.

FIG. 1 is a block diagram showing an image forming apparatus according an embodiment of the present invention. In FIG. 1, an image forming apparatus 1 includes a system control unit 2 for exercising overall control relating to image generation, an operation unit 3 serving as an interface for an operator, a scanner engine 4 for scanning images from original copies, a plotter engine 5 for printing images on paper sheets, and a finisher 6 for performing the sorting, storing, or the like of printed sheets. The system control unit 2, the operation unit 3, the scanner engine 4, and the plotter engine 5 are coupled to each other through a high-speed serial bus. With this configuration, the image forming apparatus 1 can provide functions such as the scanner function, the copier function, the printer function, etc.

The system control unit 2 is coupled to an external network 7, and is thus operable to communicate with a scanner 81, a printer 82, a multifunction peripheral (MFP) 83, a personal computer (PC) 84, a server 85, a Web site 86, etc., connected to the external network 7.

The system control unit 2 includes an image-data-flow control unit 201 for controlling a data flow from the scanning of image data to the printing of the image data, a system controller 202 for controlling base functions, a RAM 203 for storing data used in the control of the system controller 202, a ROM 204, and a NVRAM 205. The NVRAM 205 is a nonvolatile memory.

The system control unit 2 further includes an HDD 206 for storing image data, image processing programs, and the like, a work-space memory 207, an image processing unit 208 for attending to such processing as the rotation of an image, a drawing unit 209 for drawing images, an optional expansion unit 210 for expanding functions, a conversion unit 211 for communicating with the scanner engine 4 through the corresponding high-speed serial bus, and a conversion unit 212 for communicating with the plotter engine 5 through the corresponding high-speed serial bus.

The operation unit 3 includes a CPU 31 for controlling processes performed in the operation unit 3, a RAM 32 for storing data used for control, a ROM 33, a font ROM 34 for storing display-purpose fonts, a display unit 35 such as a liquid crystal panel for displaying processing status, a process menu, and the like, a command receiving unit 36 for receiving commands from the operator, a data-carrier interface unit 37 for reading or writing data from or to a data carrier implemented as an ID card or the like held by the operator, and a conversion unit 38 for communicating with the system control unit 2 through the corresponding high-speed serial bus.

The scanner engine 4 includes an imaging unit 41 for taking images of original copies, an A/D conversion unit 42 for converting the image signal into digital data, and a converting unit 43 for communicating with the system control unit 2 through the corresponding high-speed serial bus.

The plotter engine 5 includes a process controller 51 for controlling printing processes inside the plotter engine 5, a RAM 52 for storing data used in the control, a ROM 53, a NVRAM 54, an image forming unit 55 for forming images on a drum or the like for subsequent printing, a conversion unit 56 for communicating with the system control unit 2 through the corresponding high-speed serial bus, and a charge accumulating unit 57 for discharging accumulated electric charge for the purpose of rapidly warming up the fuser system at the time of return from an energy saving mode. The charge accumulating unit 57 is comprised of a large-capacity condenser, a secondary battery, or the like, and is configured to be charged when power is supplied to the plotter engine 5.

The finisher 6 includes an internal stacker 61 having a plurality of bins for storing printed sheets on a job-by-job basis or the like and a sheet-ejection tray 62 for holding the ejected sheets.

Figure 2A:
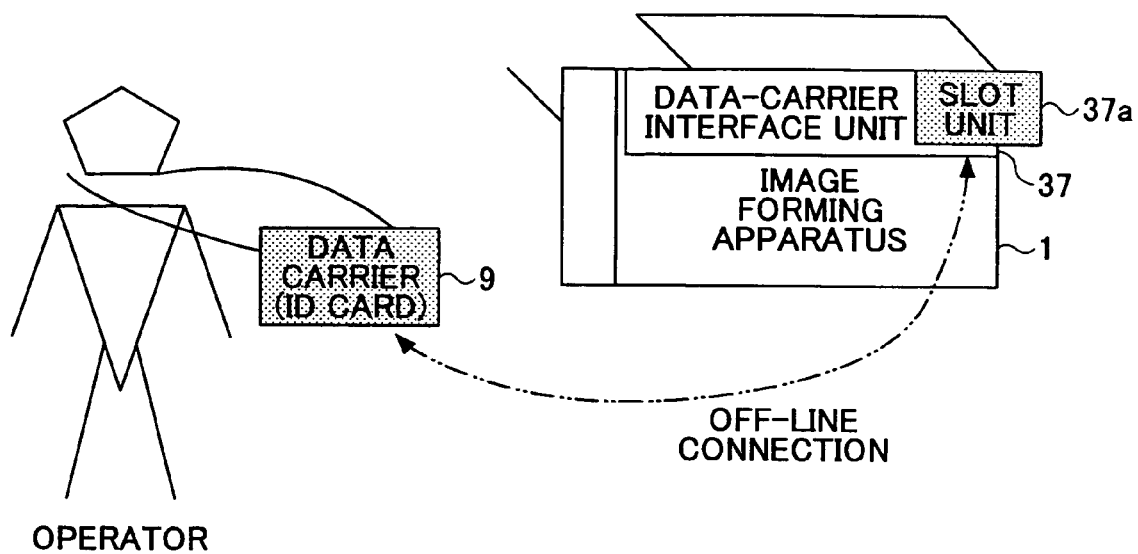
FIGS. 2A and 2B are drawings showing a method of coupling a data carrier to the image forming apparatus where the data carrier is implemented as an ID card or the like held by an operator.
Figure 2B:
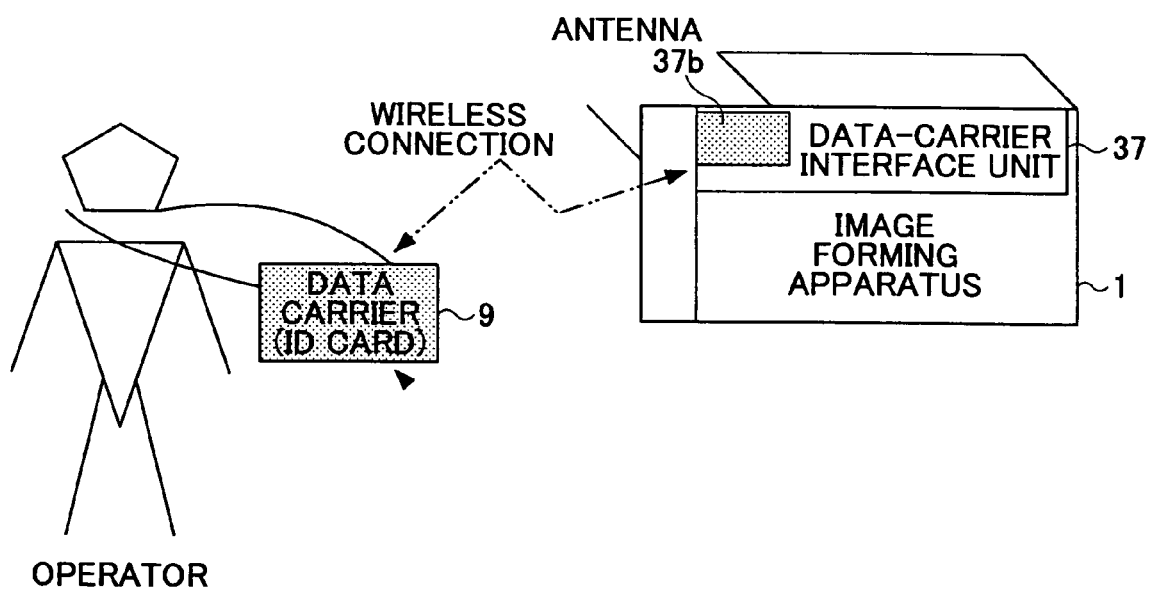

FIGS. 2A and 2B are drawings showing a method of coupling a data carrier 9 to the image forming apparatus 1 where the data carrier 9 is implemented as an ID card or the like held by an operator. FIG. 2A illustrates a method for off-line coupling. The data-carrier interface unit 37 of the image forming apparatus 1 has a slot unit 37a, into which the data carrier 9 is inserted, resulting in the terminal pins being brought into physical contact with each other. This makes it possible to read data stored in the data carrier 9 or write data to the data carrier 9. As the data carrier 9, any one of various types of memory media may be used such as an IC card, a memory stick, or an SD card.

FIG. 2B illustrates a method for wireless coupling. The data-carrier interface unit 37 of the image forming apparatus 1 is provided with an antenna 37b, to which the data carrier 9 is brought closer. This makes it possible to read data stored in the data carrier 9 or write data to the data carrier 9. In this case, a wireless tag (RFID) or the like may be used for the data carrier 9.

Figure 3:
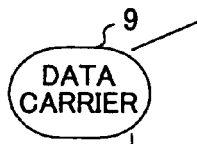
FIG. 3 is a drawing showing an example of data stored in the data carrier.

FIG. 3 is a drawing showing an example of data stored in the data carrier 9. The data stored in the data carrier 9 includes "personal ID" indicative of personal information about the owner, "mother-tongue language information" indicative of the language to be used, "copy operation mode" indicative of copy settings that are frequently used, "reference data" indicative of address information or the like of a personal computer, a server, or the like that is frequently accessed, "history" indicative of usage history, "program" for use in displaying a personal wall paper, a personal clock, etc., on the display screen, etc. The data stored in the data carrier 9 is not limited to these examples, and various data may be stored according to need.

Figure 4A:
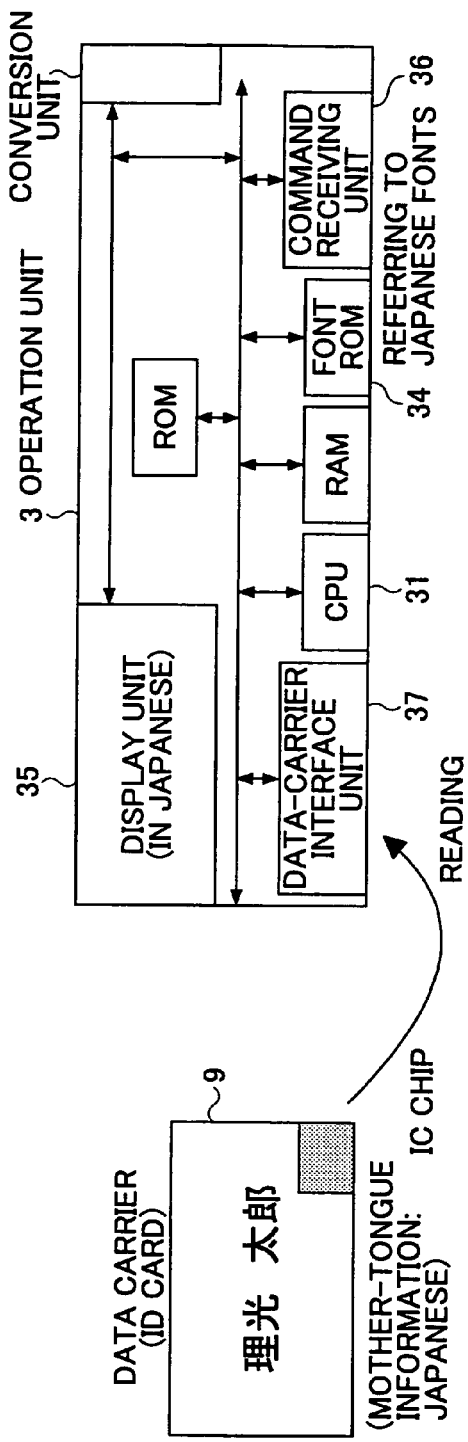
FIGS. 4A and 4B are illustrative drawings showing the outline of display language setting based on the data carrier.
Figure 4B:
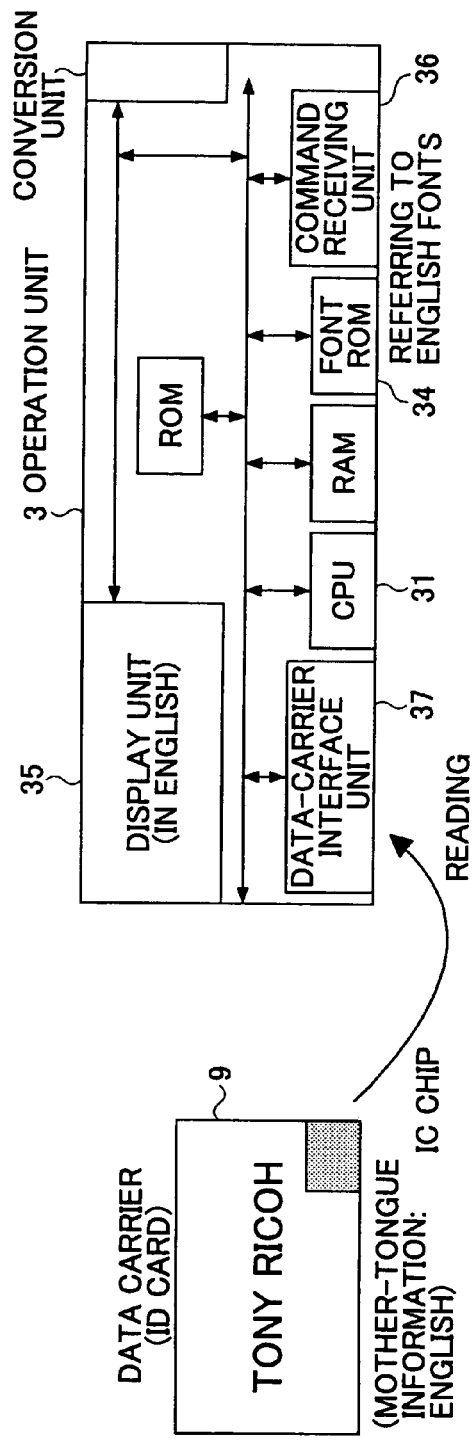
Figure 5A:
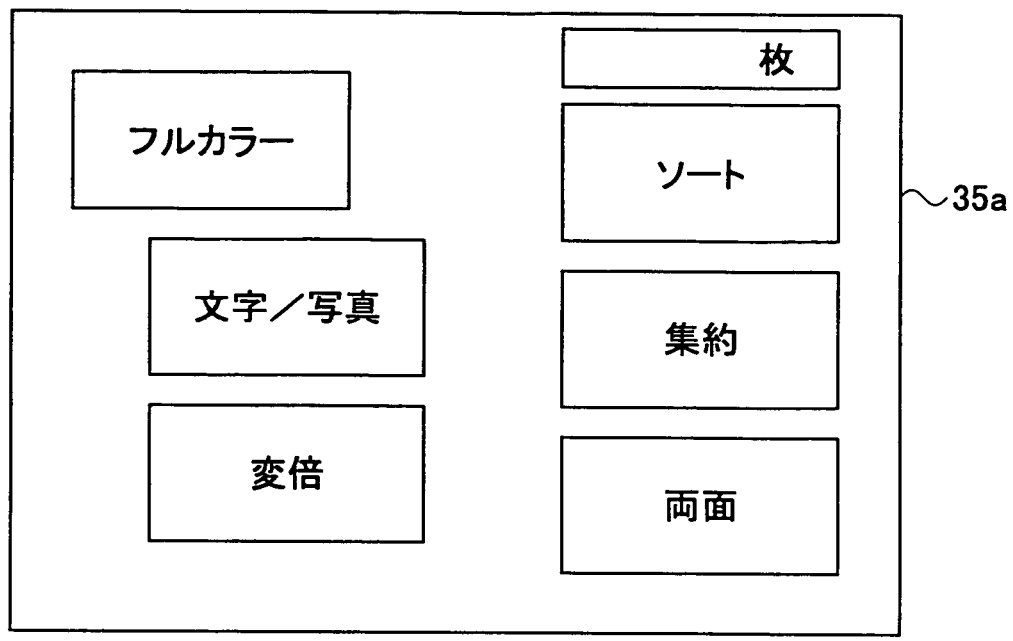
FIG. 5A is an illustrative drawing showing an example of the displaying of the Japanese language on a display screen of a display unit.

FIGS. 4A and 4B are illustrative drawings showing the outline of display language setting based on the data carrier 9. As shown in FIG. 4A, the data carrier 9 having the mother-tongue language information indicative of the Japanese language is set in the operation unit 3 of the image forming apparatus 1. In response, the data-carrier interface unit 37 operating under the control of the CPU 31 reads the data from the IC chip inside the data carrier 9, and obtains the Japanese-language fonts from the font ROM 34, thereby displaying the Japanese language on the display unit 35. FIG. 5A is an illustrative drawing showing an example of the displaying of the Japanese language on a display screen 35a of the display unit 35.

Figure 5B:
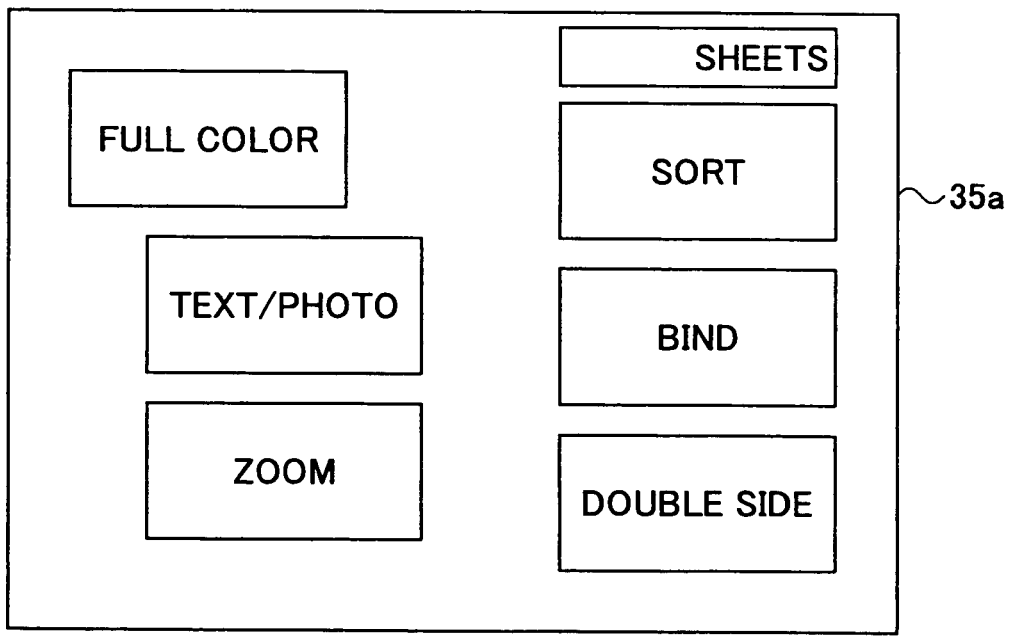
FIG. 5B is an illustrative drawing showing an example of the displaying of the English language on the display screen of the display unit.

As shown in FIG. 4B, the data carrier 9 having the mother-tongue language information indicative of the English language is set in the operation unit 3 of the image forming apparatus 1. In response, the data-carrier interface unit 37 operating under the control of the CPU 31 reads the data from the IC chip inside the data carrier 9, and obtains the English-language fonts from the font ROM 34, thereby displaying the English language on the display unit 35. FIG. 5B is an illustrative drawing showing an example of the displaying of the English language on the display screen 35a of the display unit 35. If there is a need for language fonts that are not in existence in the font ROM 34, these fonts are obtained through another route as will be described later.

Figure 6:
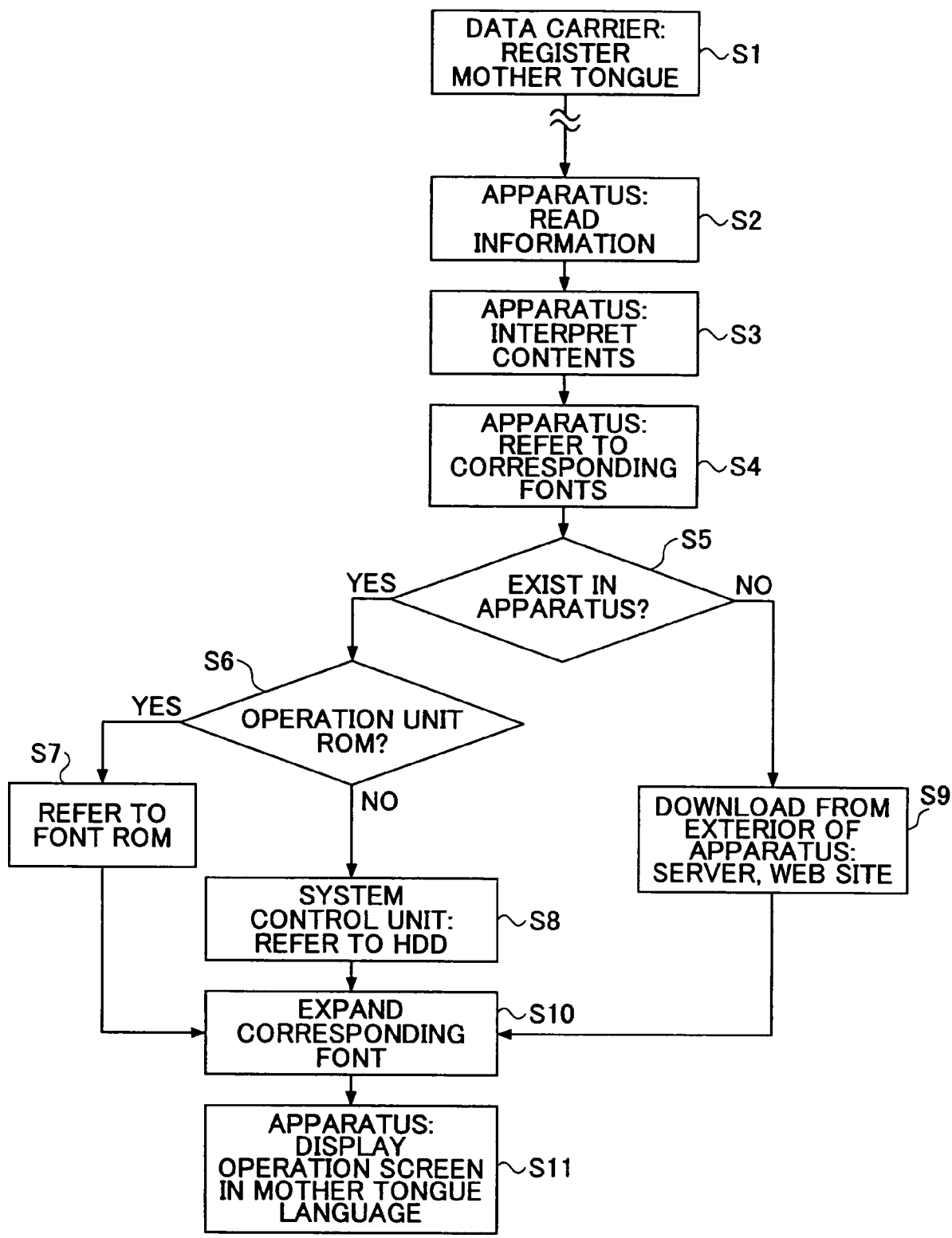
FIG. 6 is a flowchart showing a process of setting a display language based on the data carrier.

FIG. 6 is a flowchart showing a process of setting a display language based on the data carrier 9. In FIG. 6, information indicative of the mother-tongue language is registered in the data carrier 9 in advance (step S1). When the data carrier 9 is set in the image forming apparatus 1, the apparatus (image forming apparatus 1) first reads the information from the data carrier 9 (step S2), and then interprets the retrieved information (step S3).

Thereafter, fonts necessary for display are identified based on the interpreted results, and the identified fonts are referred to (step S4), thereby checking whether these fonts are available within the apparatus (step S5). If these fonts are available (present) within the apparatus (Yes at step S5), a check is made as to whether these fonts are stored in the font ROM 34 of the operation unit 3 (step S6). If they are stored there (Yes at step S6), the font ROM 34 is accessed (step S7) to expand the fonts (step S10), thereby displaying by use of the fonts on the display unit 35 of the operation unit 3 (step S11).

If the required fonts are available within the apparatus, but are not stored in the font ROM 34 (No at step S6), the HDD 206 of the system control unit 2 is accessed to obtain the required fonts (step S8). The fonts are then expanded (step S10), and are used to display on the display unit 35 of the operation unit 3 (step S11).

If the required fonts are not available within the apparatus (No at step S5), the system control unit 2 accesses the server 85, the Web site 86, or the like through the external network 7 to download the required fonts to the RAM 32 (step S9). The fonts are then expanded (step S10), and are used to display on the display unit 35 of the operation unit 3 (step S11). The downloaded fonts are erased after the operator finishes using the fonts.

Through the processes described above, automating setting is made so as to display information in the mother-tongue language that is easy for the operator to understand at the time of using the image forming apparatus 1.

Figure 7:
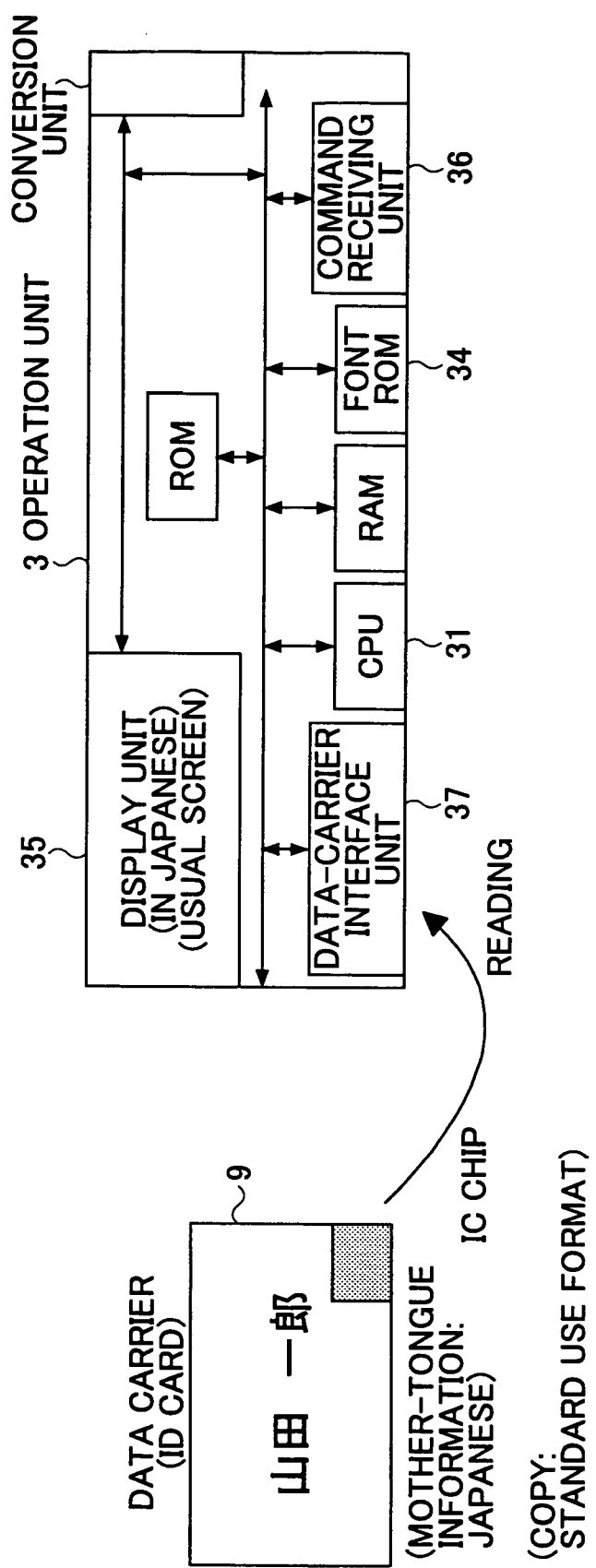
FIG. 7 is a drawing showing the outline of operation mode setting based on the data carrier.
Figure 8A:
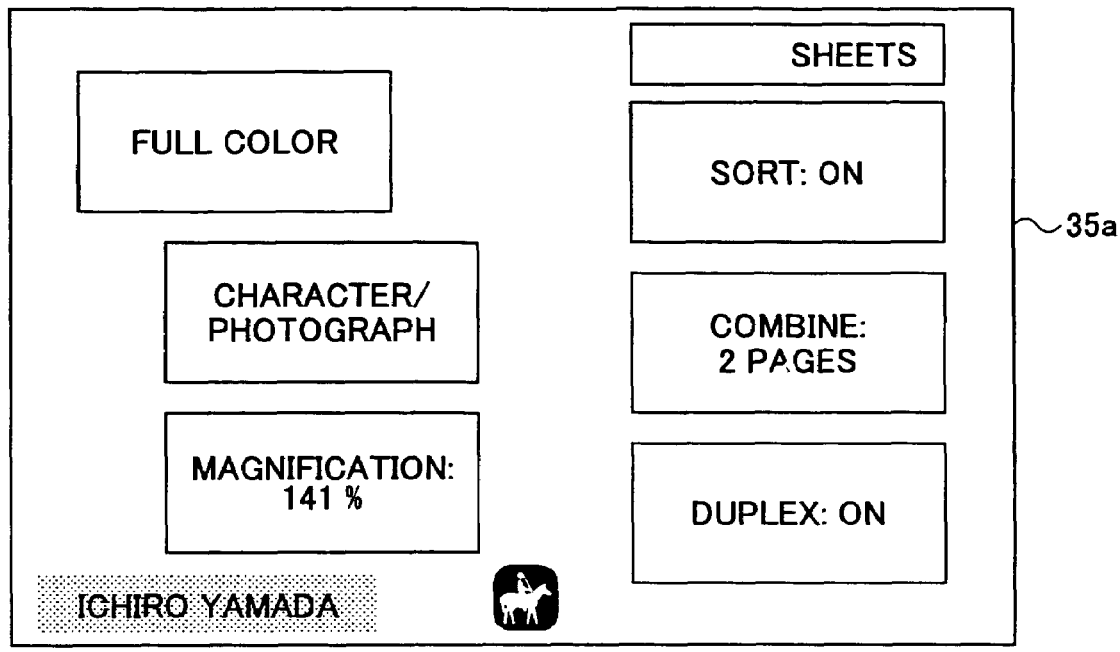
FIGS. 8A and 8B are illustrative drawings showing examples of the display screen of an operation unit configured based on the operation mode settings.
Figure 8B:
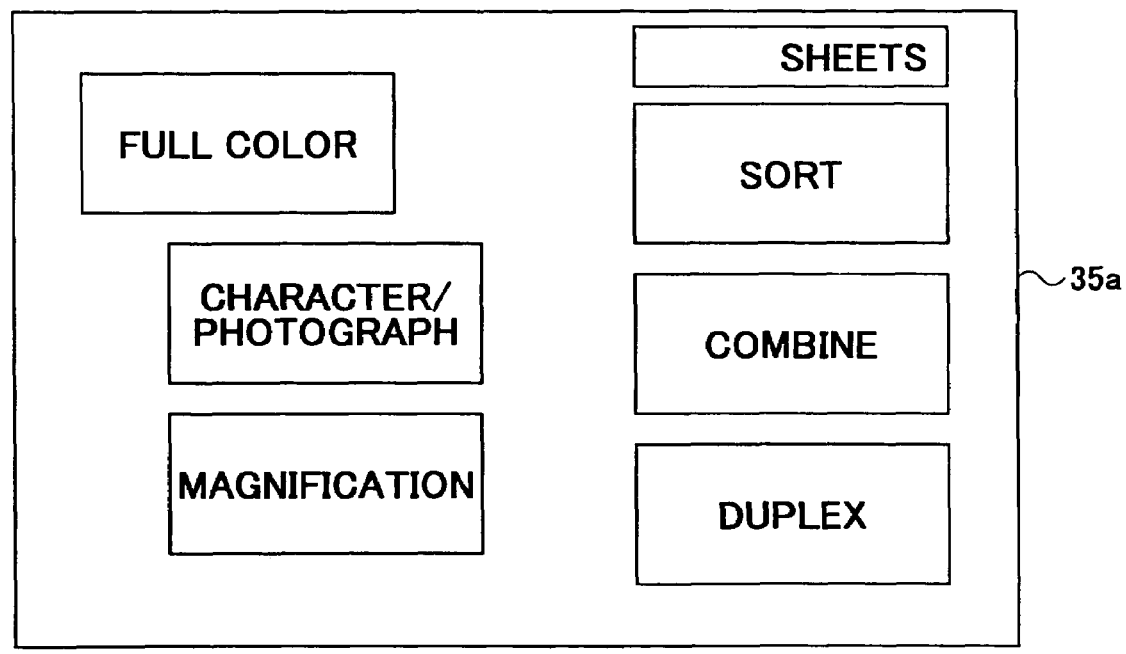

FIG. 7 is a drawing showing the outline of operation mode setting based on the data carrier 9. Provision is made such that not only the display language setting but also operation mode settings inclusive of detailed settings such as copy settings can be made. In FIG. 7, the data carrier 9 is set in the optical head 3 of the image forming apparatus 1. In response, the data-carrier interface unit 37 operating under the control of the CPU 31 reads data from the IC chip inside the data carrier 9, and makes settings to the image forming apparatus 1 according to the operation mode information. FIGS. 8A and 8B are illustrative drawings showing examples of the display screen 35a of the operation unit 3 configured based on the operation mode settings. FIG. 8A illustrates the screen on which settings are automatically made with respect to the image type (character/photograph), magnification, a sorting function, combine printing, duplex printing, etc., in relation to the full-color copying function. FIG. 8B illustrates an example of the display screen 35a when displaying using larger characters is specified.

Figure 9:
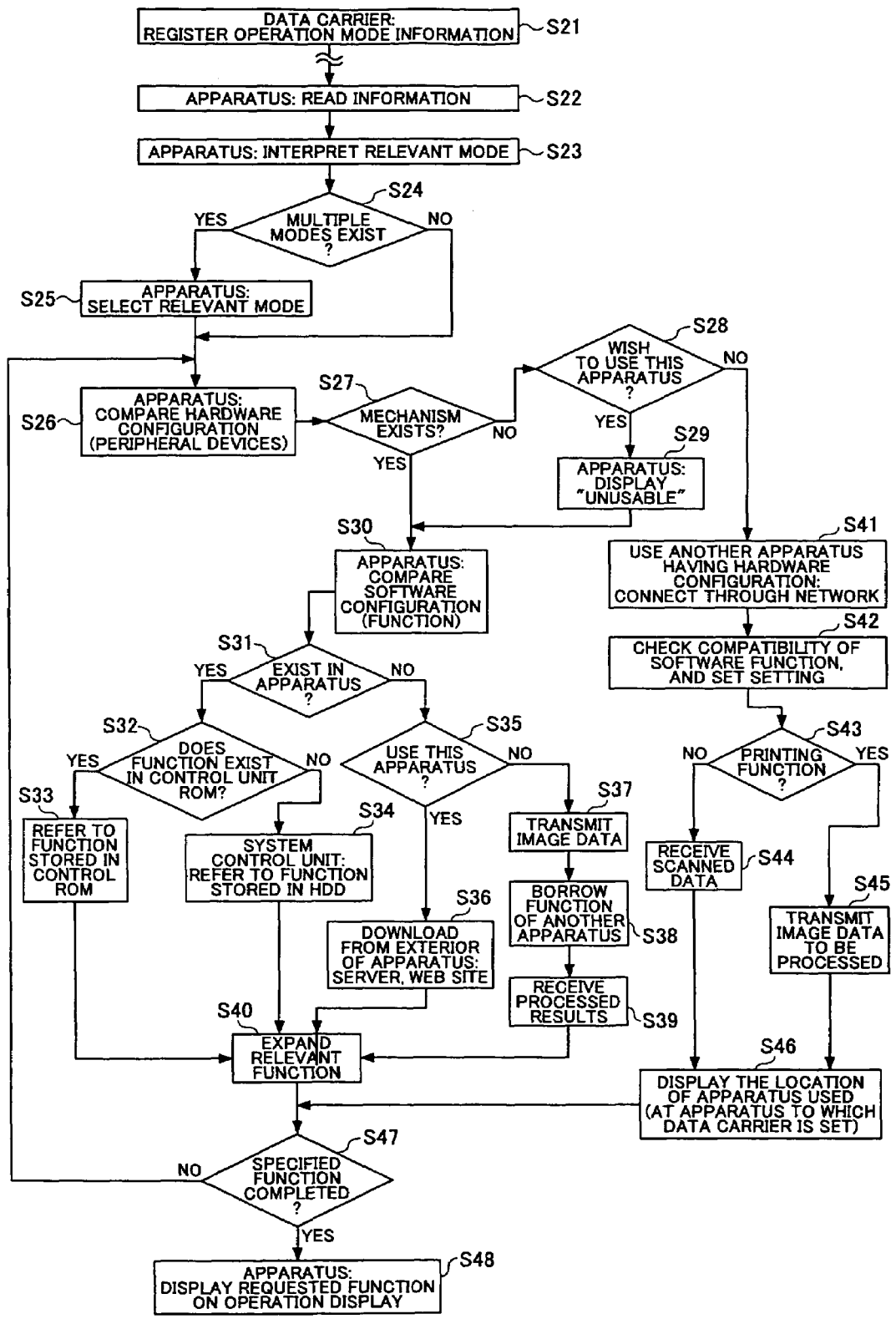
FIG. 9 is a flowchart showing a process of setting operation modes based on the data carrier.

FIG. 9 is a flowchart showing a process of setting operation modes based on the data carrier 9. In FIG. 9, operation mode information is registered in the data carrier 9 in advance (step S21). When the data carrier 9 is set in the image forming apparatus 1, the apparatus (image forming apparatus 1) first reads the information from the data carrier 9 (step S22), and then interprets relevant mode(s) (step S23). A check is then made as to whether the relevant mode(s) are multiple modes or not (step S24). If they are not (No at step S24), nothing is done. If they are multiple modes (Yes at step S24), the operator is prompted to select a relevant mode (step S25). Thereafter, the hardware configuration specified in the operation mode is compared with the hardware configuration of the apparatus (step S26). A check is then made as to whether a relevant mechanism is present in the apparatus (step S27).

If the relevant mechanism is not present in the apparatus (No at step S27), a question is asked to the operator to check whether the operator desires to use this apparatus (step S28) If the answer indicates the desire to use the apparatus (Yes at step S28), a message is displayed to indicate that the apparatus cannot be used (step S29).

If the relevant mechanism is present in the apparatus (Yes at step S27) or if the message is presented to indicate that the apparatus cannot be used (step S29), the software configuration specified in the operation mode is compared with the software configuration of the apparatus (step S30). A check is then made as to whether the relevant software configuration is present in the apparatus (step S31).

If the relevant software configuration is present in the apparatus (Yes at step S31), a check is made as to whether the relevant function is available in the control-purpose ROM 204 of the system control unit 2 (step S32). If the relevant function is available in the ROM 204 (Yes at step S32), the relevant function of the ROM 204 is accessed (step S33). If the relevant function is not available in the ROM 204 (No at step S32), the relevant function is accessed in the HDD 206 of the system control unit 2 (step S34).

If the relevant software configuration is not present in the apparatus (No at step S31), a question is asked to the operator to check whether the operator desires to use this apparatus (step S35). If the answer indicates the desire to use the apparatus (Yes at step S35), the system control unit 2 accesses the server 85, the Web site 86, or the like through the external network 7 to download a function module corresponding to the required function to the RAM 203 (step S36) If the answer indicates the desire not to use the apparatus (No at step S35), the image data, when ready to be processed, is transmitted through the external network 7 to the multifunction peripheral 83 or the like which is provided with the required function (step S37). The processing is thus performed by utilizing the function of another apparatus (step S38), followed by receiving the processing results (step S39).

After the required function is accessed in the ROM 204 of the system control unit 2 (step S33) or accessed in the HDD 206 of the system control unit 2 (step S34), or after the function module corresponding to the required function is downloaded from the server 85, the Web site 86, or the like (step S36), or after the processing results are received from another apparatus (step S39), the expansion of the relevant function and the like are performed (step S40).

If the required mechanism (relevant mechanism) is not present in the apparatus (No at step S27) and if the operator's answer indicates the desire not to use this apparatus (No at step S28), access is made through the external network 7 to the multifunction peripheral 83 or the like which is provided with the relevant hardware function (step S41). A check is then made as to whether software functions are compatible, and necessary settings are made (step S42). A description of the detail of the processes performed here will be omitted, and may be similar to the processes of steps S30 through S40.

Thereafter, a check is made as to whether the printing function is to be used (step S43). If the scanner function or the like is used without using the printing function (No at step S43), the scanned data is received (step S44). If the printing function is used (Yes at step S43), the image data to be processed is transmitted (step S45) After the receipt of the scanned data (step S44) or the transmission of the image data to be processed (step S45), the location of the apparatus used is displayed on the display unit 35 of the apparatus in which the data carrier 9 is set (step S46).

After the expansion of the required function and the like (step S40) or the displaying of the location of the apparatus used (step S46), a check is made as to whether all the processes are completed with respect to the function specified by the operation mode of the data carrier 9 (step S47). If uncompleted (No at step S47), the procedure goes back to the comparison of hardware configurations (step S26). If completed (Yes at step S47), a message is displayed to indicate the required function on the display unit 35 of the apparatus (step S48).

Through the processes described above, settings for the operation mode desired by the operator are automatically made so as to perform desired processes at the time of using the image forming apparatus 1.

Figure 10A:
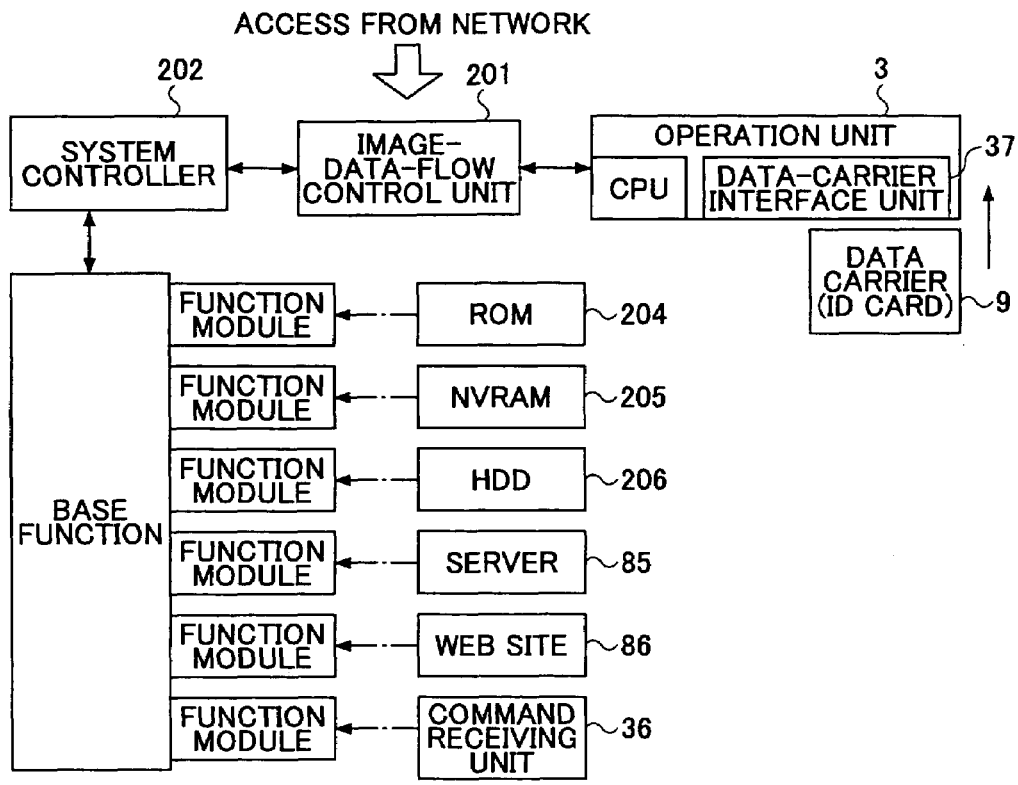
FIGS. 10A and 10B are drawings showing the outline of adding of a functional module according to the operation mode setting.
Figure 10B:
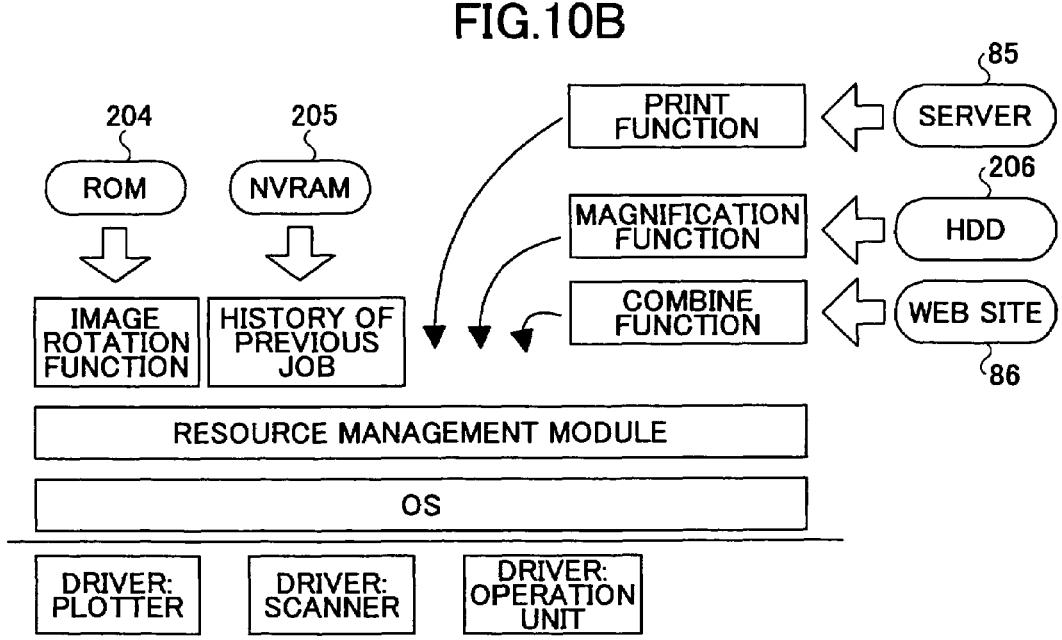

FIGS. 10A and 10B are drawings showing the outline of adding of a functional module and the like according to the operation mode setting. FIG. 10A illustrates the way a function module is added or the way a mode setting is made to the function module from the ROM 204, the NVRAM 205, the HDD 206, the server 85, the Web site 86, or the command receiving unit 36 with respect to the base function. Such operation is performed through the image-data-flow control unit 201 and the system controller 202 in response to the insertion of the data carrier 9 into the data-carrier interface unit 37 of the operation unit 3. FIG. 10B illustrates the layered configuration of software. The image-rotation function that is a default function is set through the ROM 204 with respect to the base functions such as OS, a resource management module, and various drivers. Further, previous job history is set through the NVRAM 205, and the printing function is added through the server 85. The magnification function is added through the HDD 206. The combine function is added through the Web site 86.

Figure 11:
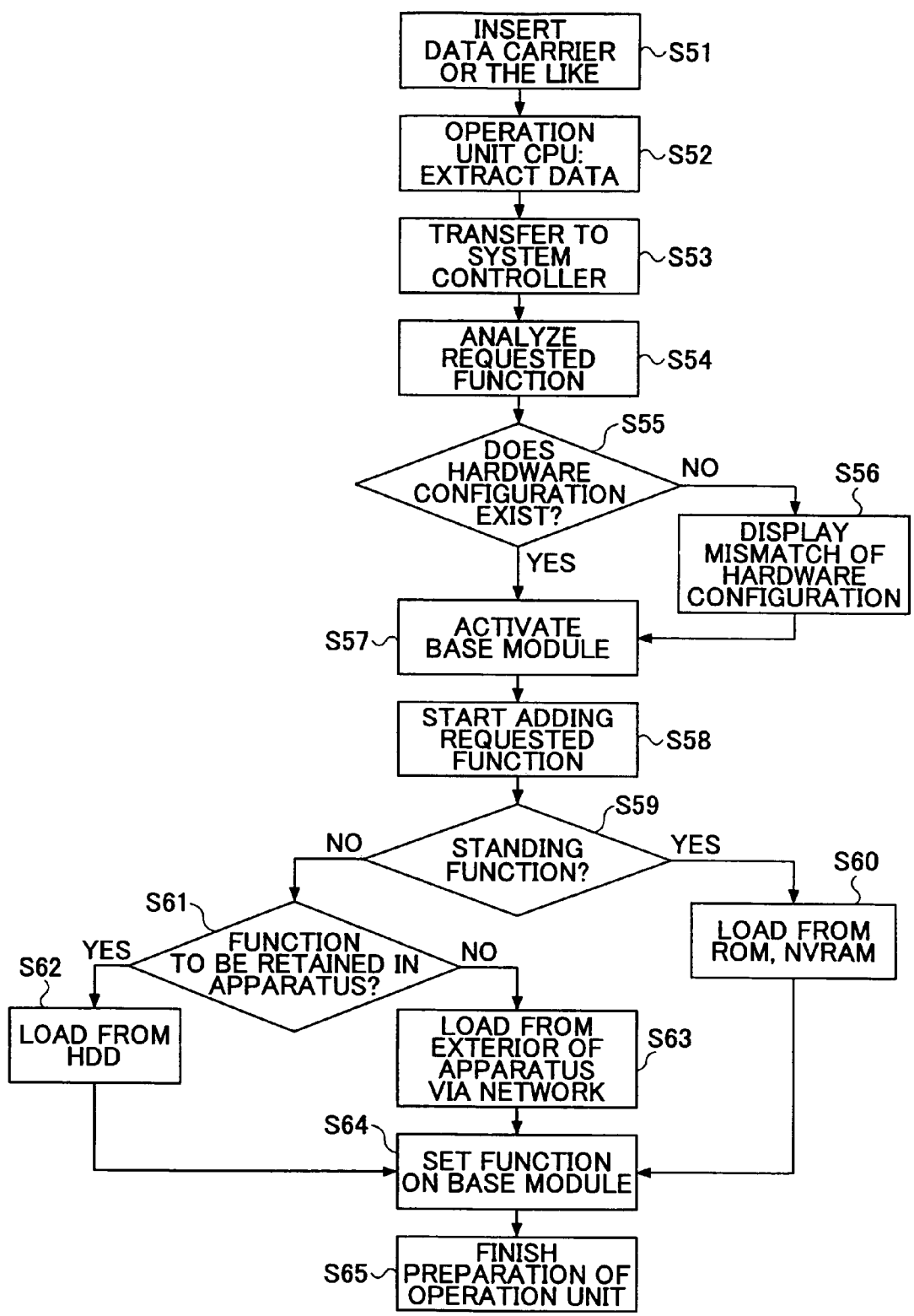
FIG. 11 is a flowchart showing a process of adding a function module.

FIG. 11 is a flowchart showing a process of adding a function module as described above. In FIG. 11, the data carrier 9 is inserted (step S51). In response, data is read from the data carrier 9 under the control of the CPU 31 of the operation unit 3 (step S52). The data is then transferred to the system controller 202 of the system control unit 2 (step S53).

The system controller 202 analyzes the transferred data to determine a required function (step S54), and checks whether the relevant hardware configuration is present (step S55). If it is present (Yes at step S55), nothing is done. If it is not present (No at step S55), a message indicative of a mismatch of hardware configurations is displayed on the display unit 35 (step S56). Thereafter, the base module is activated (step S57), and a process of adding the required function is started (step S58).

A check is then made as to whether the required function is a default function (standing function) (step S59). If it is a default function (Yes at step S59), the function is loaded from the ROM 204 or the NVRAM 205 of the system control unit 2 (step S69). If it is not a default function (No at step S59), a check is made as to whether this function is a function to be retained in the apparatus (step S61). If it is a function to be retained in the apparatus (Yes at step S61), the function is loaded from the HDD 206 of the system control unit 2 (step S62). If it is not a function to be retained in the apparatus (No at step S61), the function is loaded to the RAM 203 from an outside apparatus such as the server 85, the Web site 86, or the like through external network 7 (step S63). After the loading (step S60, S62, or S63), settings are made with respect to the base module (step S64). The preparation of the operation unit 3 then comes to an end (step S65).

Figure 12A:
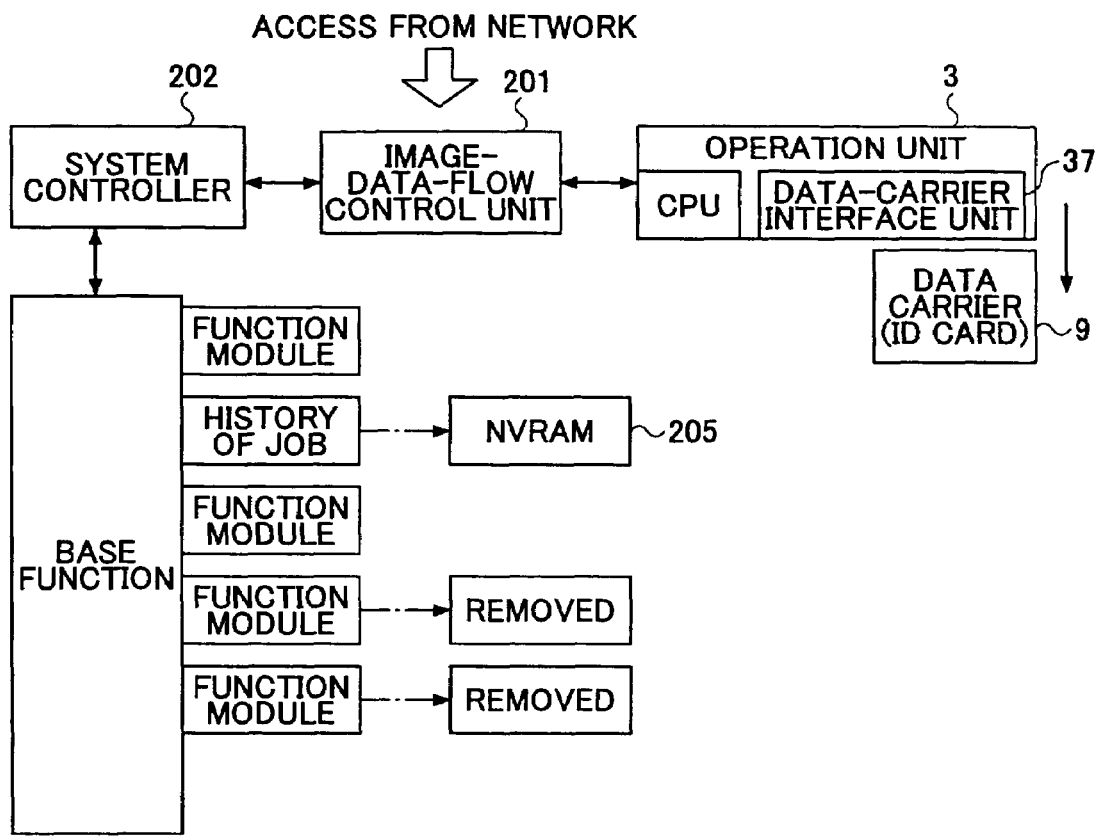
FIGS. 12A and 12B are drawings showing the outline of removal of an added function module.
Figure 12B:
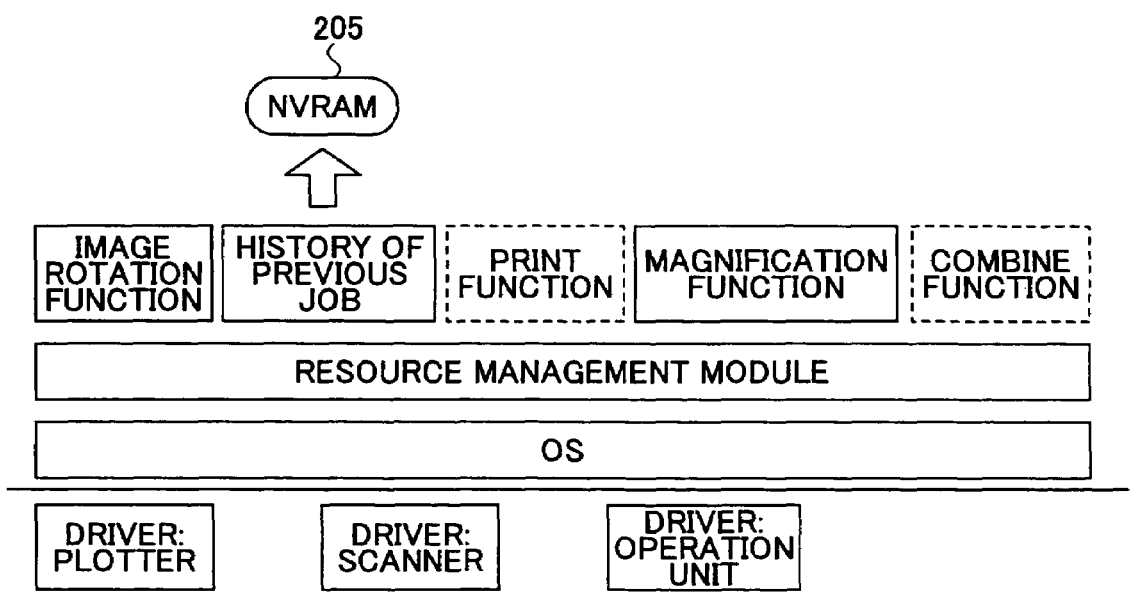

FIGS. 12A and 12B are drawings showing the outline of removal of an added function module. A function module that is added for the sake of a particular operator may often be unnecessary for other operators. Such added function module puts strain on the resources. Further, if fees are necessary for the use of a function module obtained from an outside source, it is not appropriate to let other operators use such function module freely. Because of this, such function module is removed at the timing the data carrier 9 is disconnected (after a job if the job is underway).

FIG. 12A is an illustrative drawing showing the way a function module loaded from the server 85, the Web site 86, or the like is removed and the ways a job history is written to the NVRAM 205. Such operations are performed through the image-data-flow control unit 201 and the system controller 202 in response to the decoupling of the data carrier 9 from the data-carrier interface unit 37 of the operation unit 3. FIG. 12B is an illustrative drawing showing the layered structure of software. Among the function modules that are added to the base function(s) such as the OS, the resource management module, and various drivers, the printing function loaded from the server 85 and the combine function loaded from the Web site 86 are removed as illustrated by dotted lines, and the job history is written to the NVRAM 205.

Figure 13:
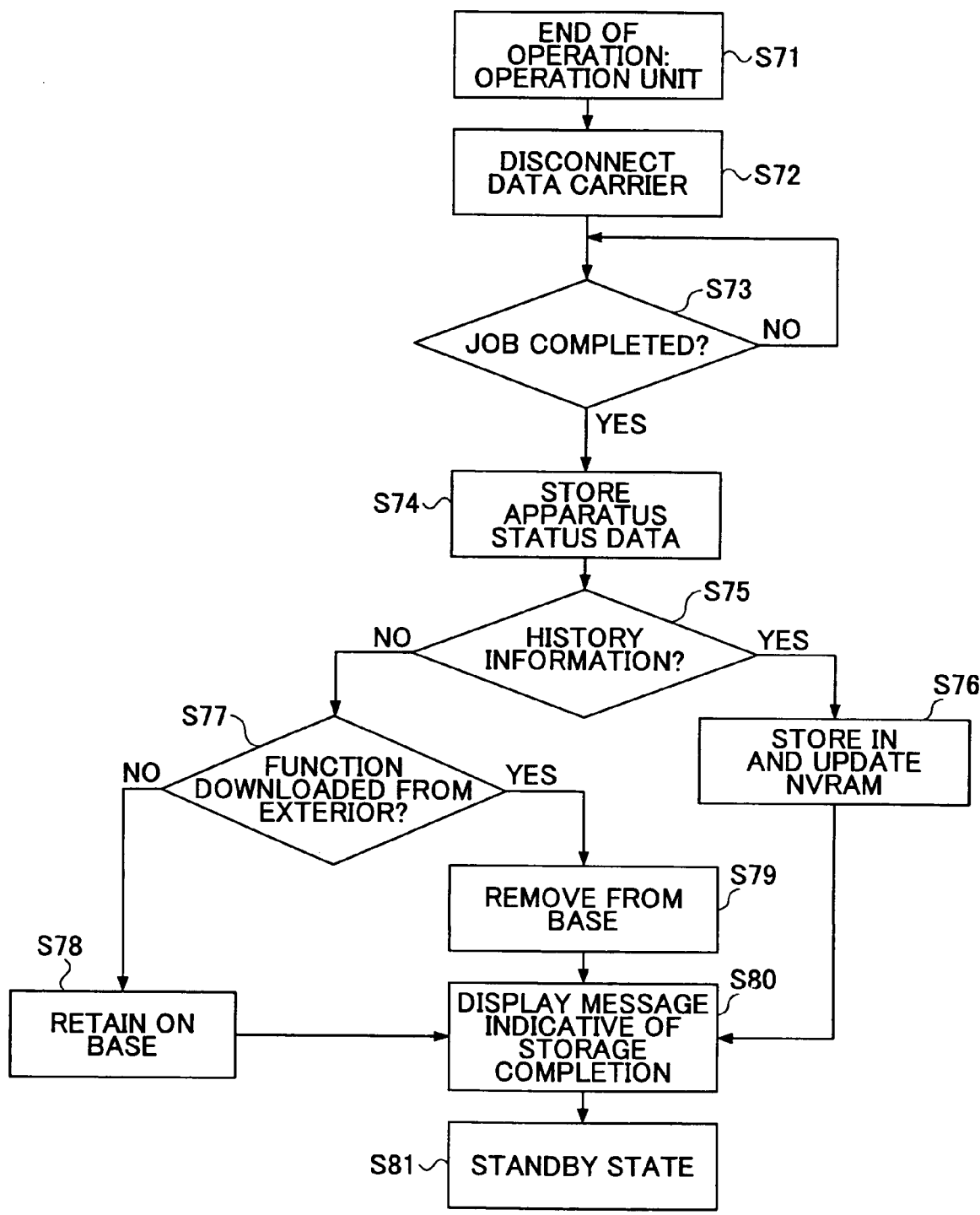
FIG. 13 is a flowchart showing a process of removing a function module.

FIG. 13 is a flowchart showing a process of removing a function module as described above. In FIG. 13, an operation on the operation unit 3 comes to an end (step S71), and the data carrier 9 is disconnected (step S72). In response, the system control unit 2 checks whether a job is completed, and waits for the completion of the job (step S73).

When the job is completed (Yes at step S73), the status data of the apparatus are stored (step S74). A check is made as to whether the stored data is history information (step S75). In the case of the history information, it is stored in the NVRAM 205 of the system control unit 2 for updating (step S76). In the case of other than history information, a check is made as to whether the data is a function module downloaded from outside (step S77). In the case of a function module downloaded from outside to the RAM 203, it is removed from the base function (step S79). In the case of other function modules, they are retained on the base function (step S78). After these processes, a message indicative of the completion of data storing is displayed (step S80). An entry into the standby state is then made (step S81). Fees may be collected for the functions used. In such a case, the history stored in the NVRAM 205 may be utilized.

Figure 14:
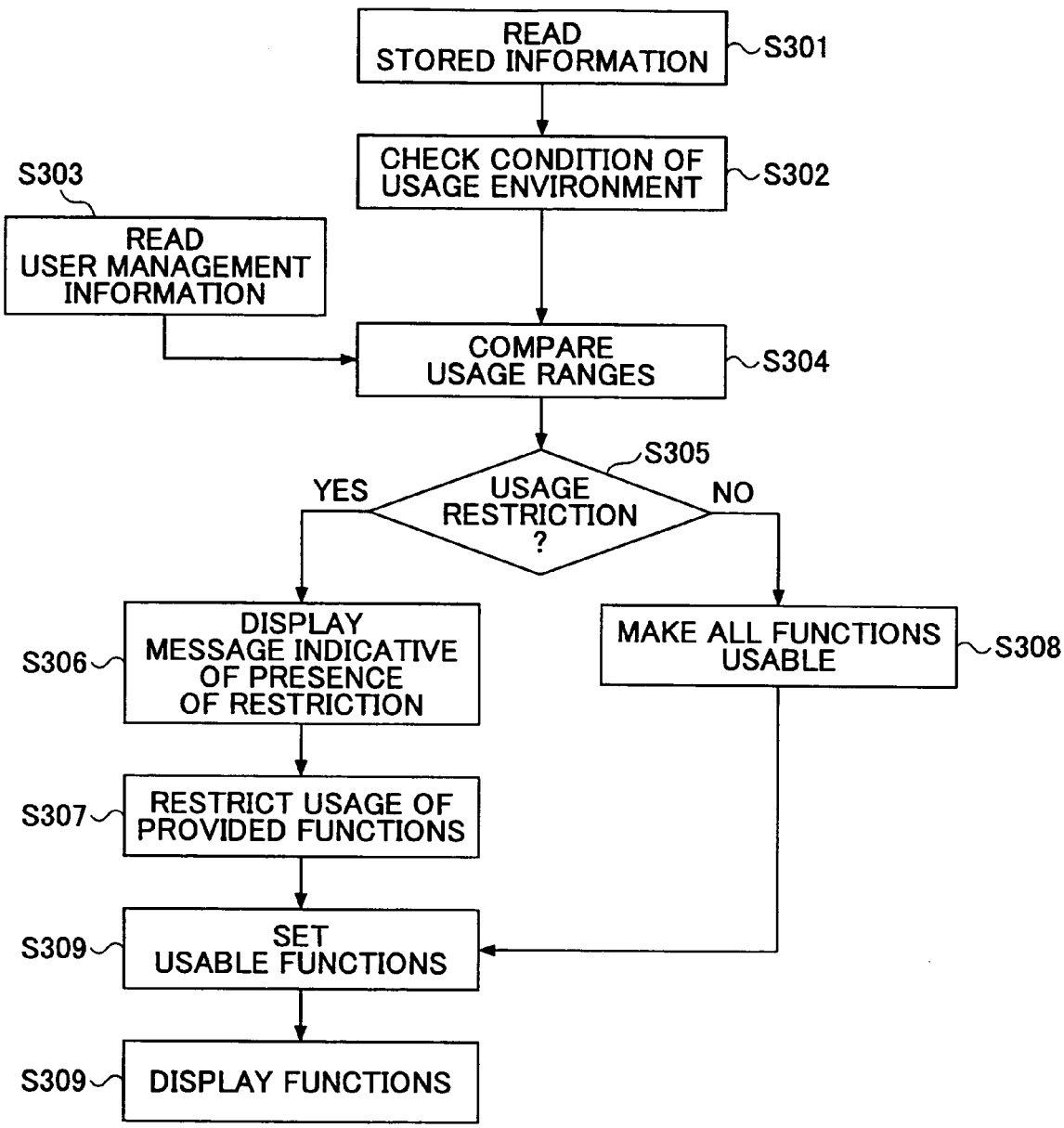
FIG. 14 is a flowchart showing a process of checking usage rights and imposing usage limitations based on the data carrier.

FIG. 14 is a flowchart showing a process of checking usage rights and imposing usage limitations based on the data carrier 9. In the example shown in FIG. 7 through FIG. 9, settings are automatically made to provide the operation mode desired by the operator for the sake of an improved operator convenience. At this time, however, predetermined usage restrictions are imposed from the management viewpoint. In FIG. 14, the data carrier 9 is set in the image forming apparatus 1 (through direct connection or wireless connection). In response, information inclusive of a personal ID and history is read from the data carrier 9 (step S301), followed by checking usage environment conditions (available functions) regarding the image forming apparatus 1 (step S302). Further, user management information (access role) that defines the usage right according to the position or the like of the operator is read from an external server or the like (step S303). At the image forming apparatus 1 to be used, the available functions are compared with a range of permitted usage responsive to the usage right of the operator (step S304), thereby determining whether there is a usage restriction (step S305).

If there is a restriction, a message indicative of the presence of a restriction is displayed on the display unit 35 of the image forming apparatus 1 (step S306). Usage restrictions are then imposed on the functions to be provided (step S307). Settings are made to the available functions (step S309). The functions are displayed on the display unit 35 (step S310). In so doing, the functions that are not available because of the restriction are presented in lighter tone or the like for visual identification. If there is no usage restriction, all the functions are made available (step S308). Settings are made to the available functions (step S309). The functions are displayed on the display unit 35 (step S310).

Figure 15:
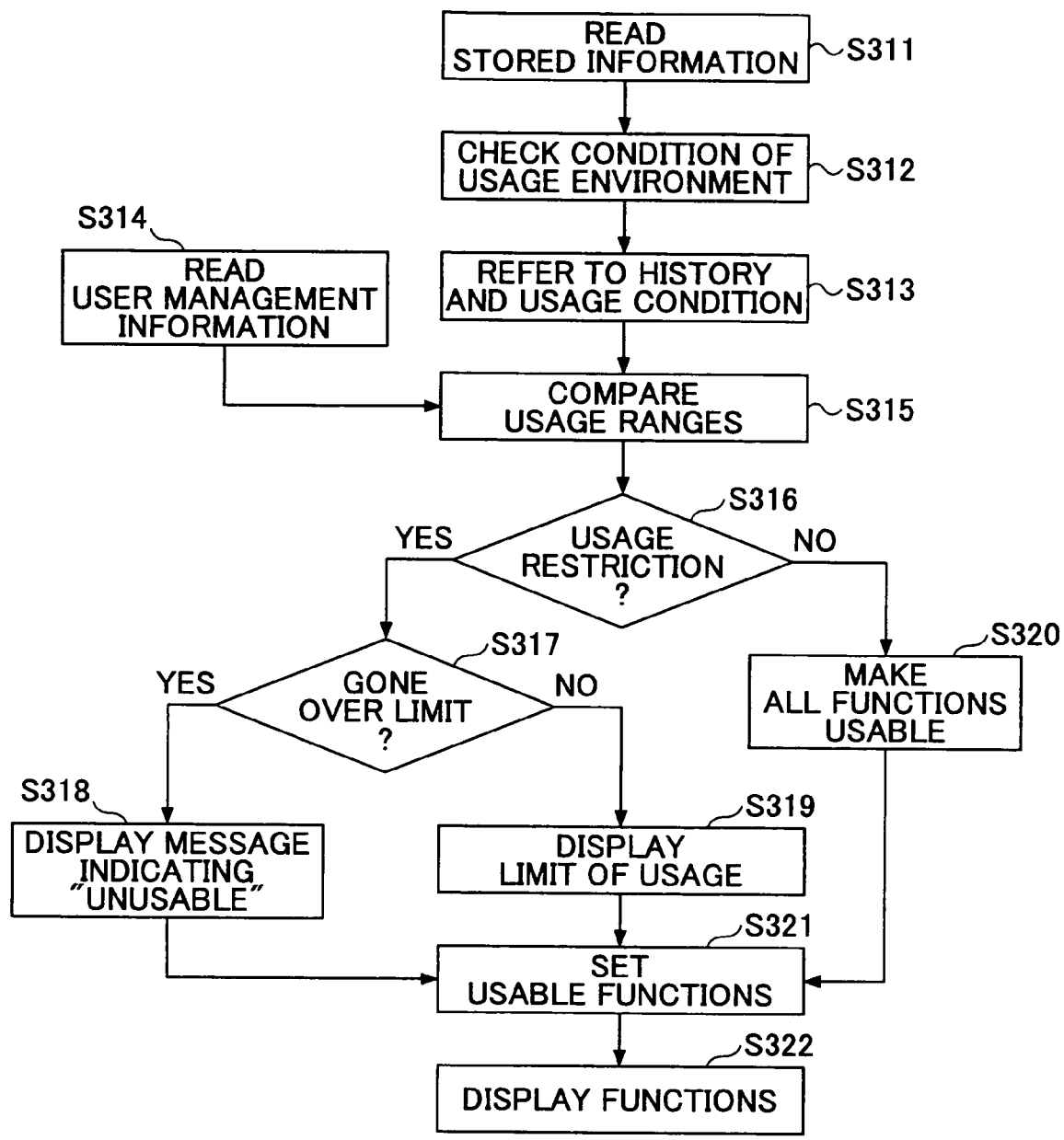
FIG. 15 is a flowchart showing another example of a process of checking usage rights and imposing usage restrictions based on the data carrier.

FIG. 15 is a flowchart showing another example of the process of checking usage rights and imposing usage restrictions based on the data carrier 9. In addition to the usage restrictions resulting from the usage right responsive to the position or the like of the operator, usage restrictions relating to usage conditions such as a limit on the number of copies are additionally used. In FIG. 15, the data carrier 9 is set in the image forming apparatus 1 (through direct connection or wireless connection). In response, information inclusive of a personal ID and history is read from the data carrier 9 (step S311), followed by checking usage environment conditions (available functions) regarding the image forming apparatus 1 (step S312). History of the number of copies and usage conditions such as the upper limit of the number of copies are thus checked (step S313). In so doing, the history of the number of copies or the like may be obtained from the contents of the data carrier 9 or from an external management server or the like, and the usage conditions such as the upper limit of the number of copies may be obtained from an external management server or the like. Further, user management information (access role) that defines the usage right according to the position or the like of the operator is read from an external server or the like (step S314). At the image forming apparatus 1 to be used, the available functions are compared with a range of permitted usage responsive to the usage right of the operator (step S315), thereby determining whether there is a usage restriction (step S316).

If there is a restriction, the history of the number of copies or the like is compared with the usage condition such as the upper limit of the number of copies, thereby to determine the whether the upper limit is exceeded (step S317). If the upper limit is exceeded, a message indicating that the requested function is not usable is displayed on the display unit 35 on the image forming apparatus 1 (step S318). Settings are made to the available functions (step S321). The functions are then displayed on the display unit 35 (step S322). In so doing, the functions that are not available because of the restriction are presented in lighter tone or the like for visual identification. If the upper limit is not exceeded, a remainder before reaching the limit (e.g., the number of copies that can be made) is displayed on the display unit 35 (step S319). Settings are made to the available functions (step S321). The functions are then displayed on the display unit 35 (step S322). If there is no usage restriction, all the functions are made available (step S320). Settings are made to the available functions (step S321). The functions are displayed on the display unit 35 (step S322).

Figure 16:
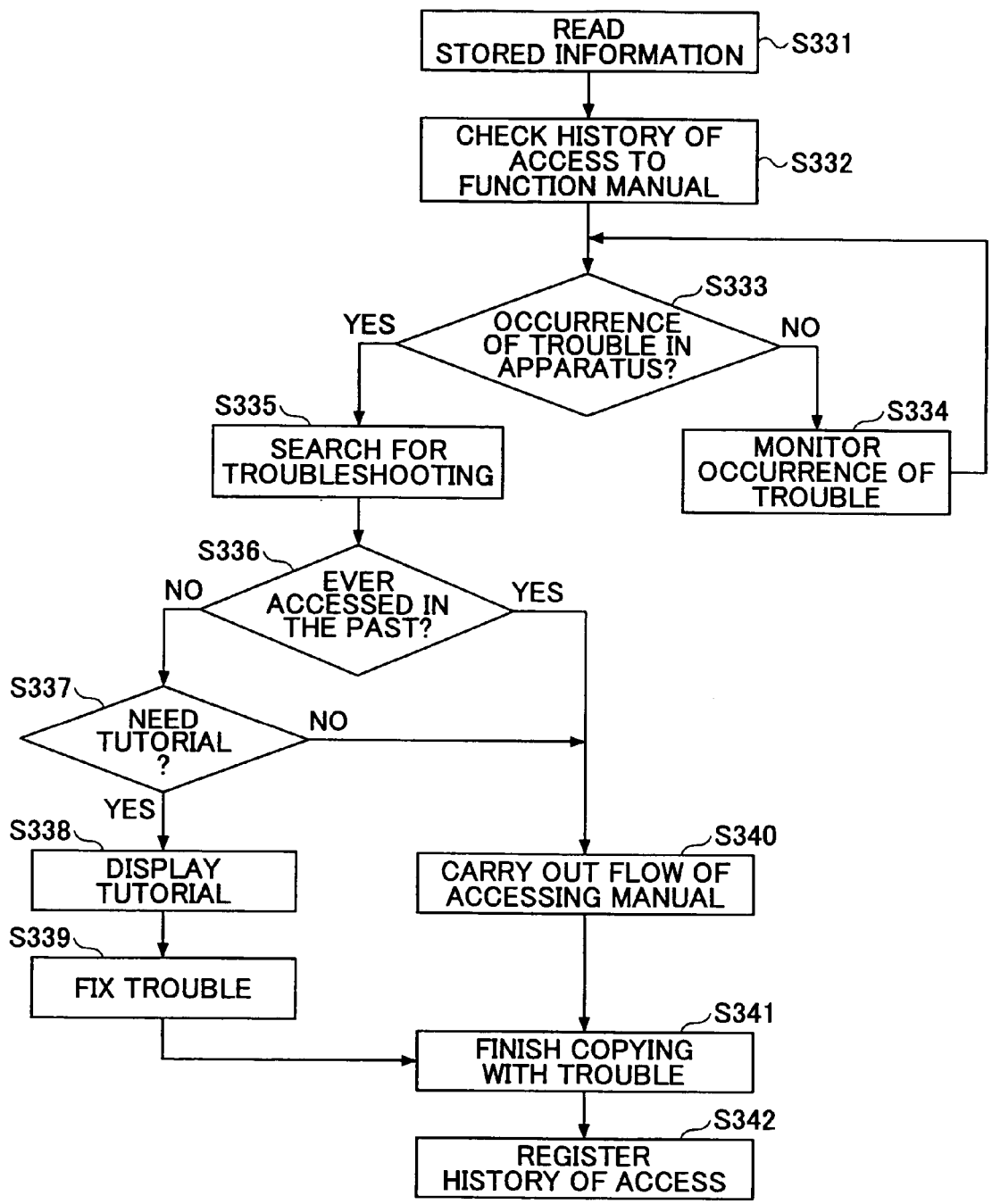
FIG. 16 is a flowchart showing a process of copying with a trouble at the time of occurrence of trouble.

FIG. 16 is a flowchart showing a process of copying with a trouble at the time of occurrence of trouble. In FIG. 16, the data carrier 9 is set in the image forming apparatus 1 (through direct connection or wireless connection). In response, information inclusive of a personal ID and history is read from the data carrier 9 (step S331), followed by checking access history regarding access to the function manuals (step S332). A check is made as to whether there is a trouble with image forming apparatus 1 (step S333). If there is no trouble, monitoring continues (step S334).

If there is a trouble with the image forming apparatus 1, a manual for troubleshooting is searched for by referring to the type of the trouble (step S335). A check is the made as to whether the operator has ever access this manual (step S336). If no access has ever been made, a question is asked to the operator to check whether the operator requires a tutorial (on-the-job guidance) (step S337). If the answer indicates the need for a tutorial, a tutorial is displayed (step S338), and the trouble is fixed (step S339). When responding to the trouble is completed (step S341), access history about the access to the tutorial is registered in the data carrier 9 (step S342).

If access has been made in the past, a flow of accessing the manual is performed (step S340). When responding to the trouble is completed (step S341), access history about the access to the manual is registered in the data carrier 9 (step S342).

Figure 17:
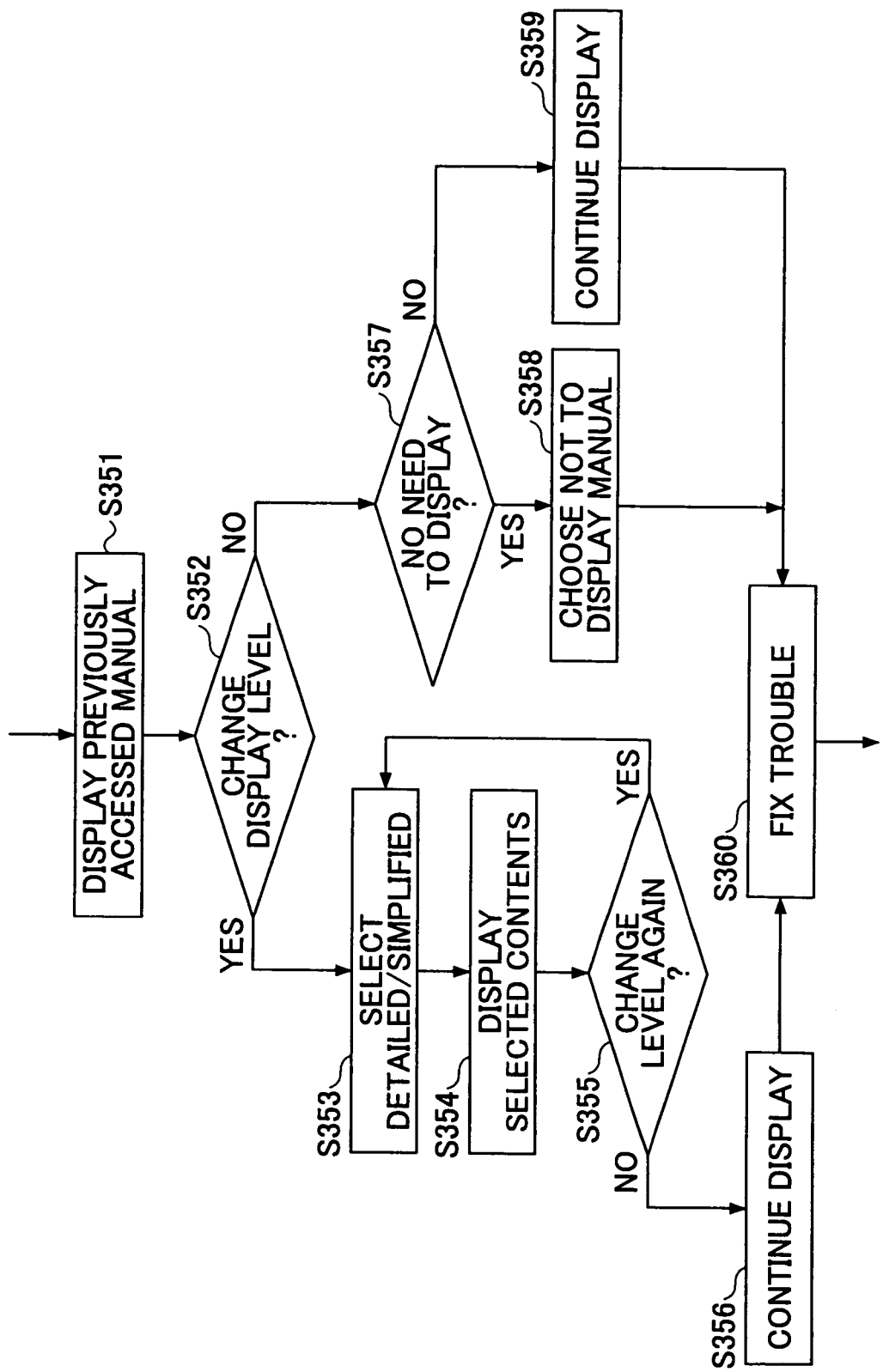
FIG. 17 is a flowchart showing the detail of a flow of accessing a manual shown in FIG. 16.

FIG. 17 is a flowchart showing the detail of the flow of accessing the manual (step S340) shown in FIG. 16. In this example, a level of the manual to be displayed and a choice of displaying/no-displaying are selectable. In FIG. 17, the manual that has been accessed in the past is displayed (step S351). A question is then asked to the operator to check whether there is a need to change the level of the displayed manual (step S352). If the answer indicates the need for a change, a display level (detailed level/simplified level) is selected (step S353), followed by displaying the manual again at the selected level (step S354). Then, a question asked to the operator to check whether there is a need to change the level of the displayed manual again (step S355). If the answer indicates the need for a change, the procedure returns to the selection of a display level (step S353). If there is no need to change the display level again, the display is maintained (step S356). The trouble is then fixed (step S360).

If the operator's answer indicates no need for a change of the display level, a question is asked to the operator to check whether the display is unnecessary (step S357). If the answer indicates no need for the display, the manual is closed so as not to be displayed (step S358). Otherwise, the displaying of the manual is continued (step S359) The trouble is then fixed (step S360).

Figure 18:
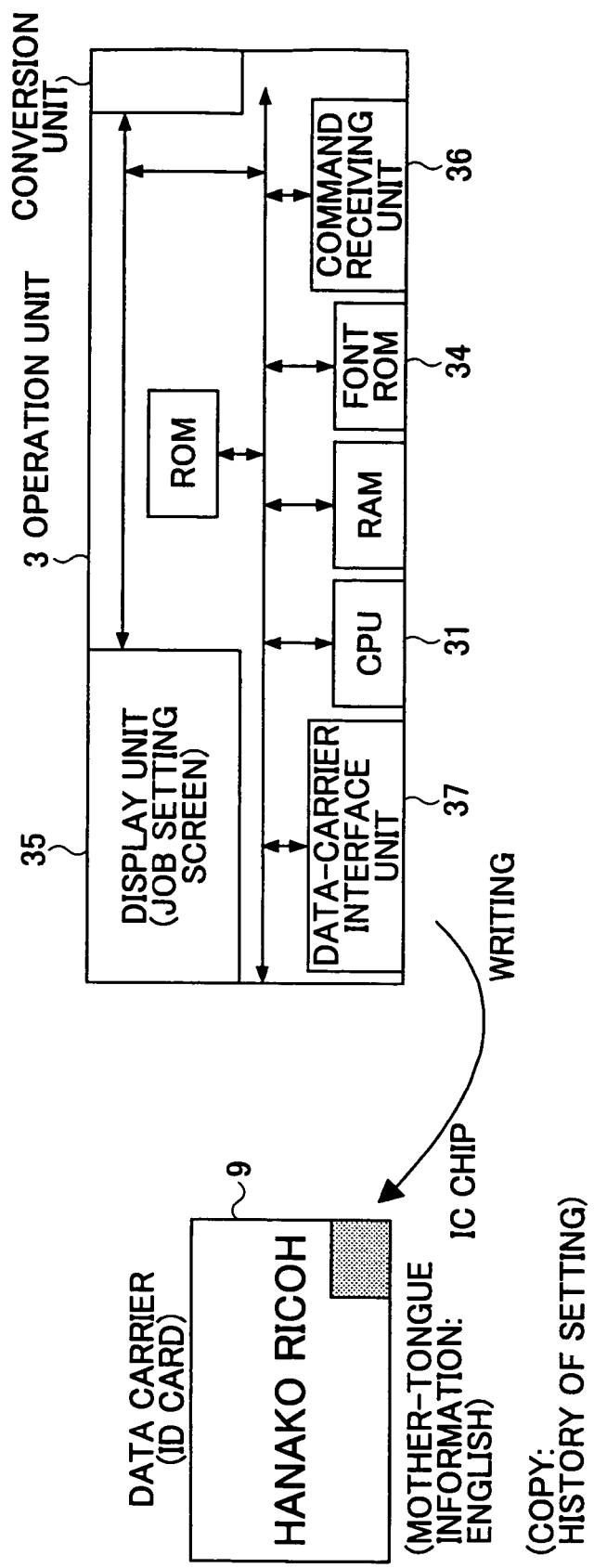
FIG. 18 is a drawing showing the outline of writing data to the data carrier.

FIG. 18 is a drawing showing the outline of writing data to the data carrier 9. At the timing the copying operation or the like comes to an end, the data-carrier interface unit 37 operating under the control of the CPU 31 of the operation unit 3 writes data to the IC chip inside the data carrier 9.

Figure 19:
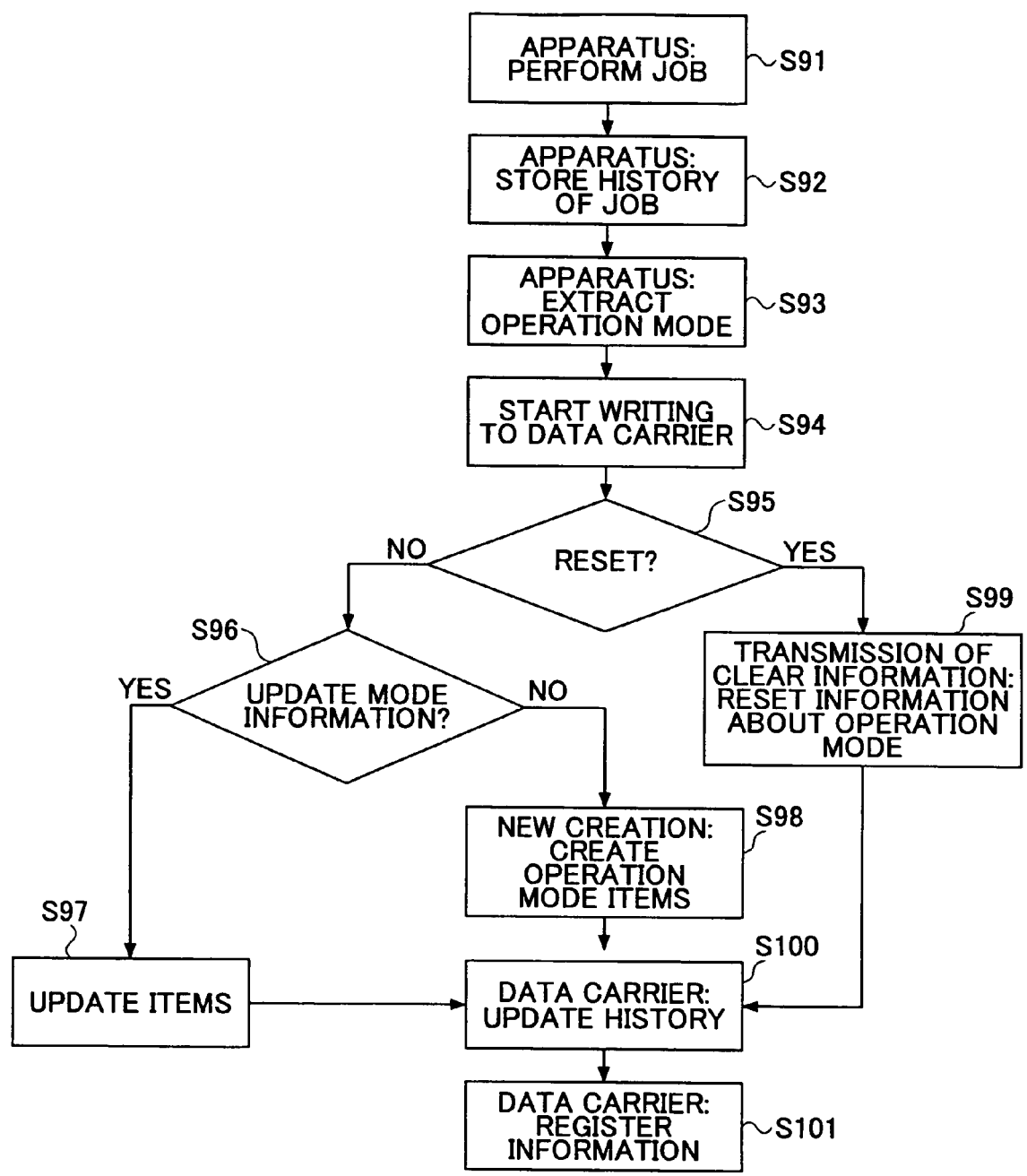
FIG. 19 is a flowchart showing a process of writing data to the data carrier.

FIG. 19 is a flowchart showing a process of writing data to the data carrier 9 as described above. In FIG. 19, a job is performed in the apparatus (image forming apparatus 1) (step S91). History of the job is stored (step S92), and, then, the operation mode is extracted (step S93).

Thereafter writing to the data carrier 9 begins (step S94). A check is made with the operator as to whether data needs to be reset (step S95). If no reset is required (No at step S95), a further check is made as to whether the operation mode information is to be updated (step S96). If the operation mode information is to be updated (Yes at step S96), modified item(s) (differential information) are updated (step S97). History is updated in the data carrier 9 (step S100). Information is registered in the data carrier 9 (step S101). Updating of the operation mode information may be utilized when registering new, modified operation mode information in place of the existing operation mode information in the storage.

In the case of the new creation of new operation mode information rather than the updating of operation mode information (No at step S96), new operation mode items are created (step S98), and history is updated in the data carrier 9 (step S100), followed by registering the information in the data carrier 9 (step S101). The new creation of operation mode information is utilized when additionally registering new operation mode information while keeping the existing operation mode information in the storage.

If the data is to be reset (Yes at step S95), the operation mode information is reset (step S99), and history is updated in the data carrier 9 (step S100), followed by registering the information in the data carrier 9 (step S101). The resetting of data is utilized when having trouble managing the registered operation mode information because too much of such information is registered, for example.

Figure 20A:
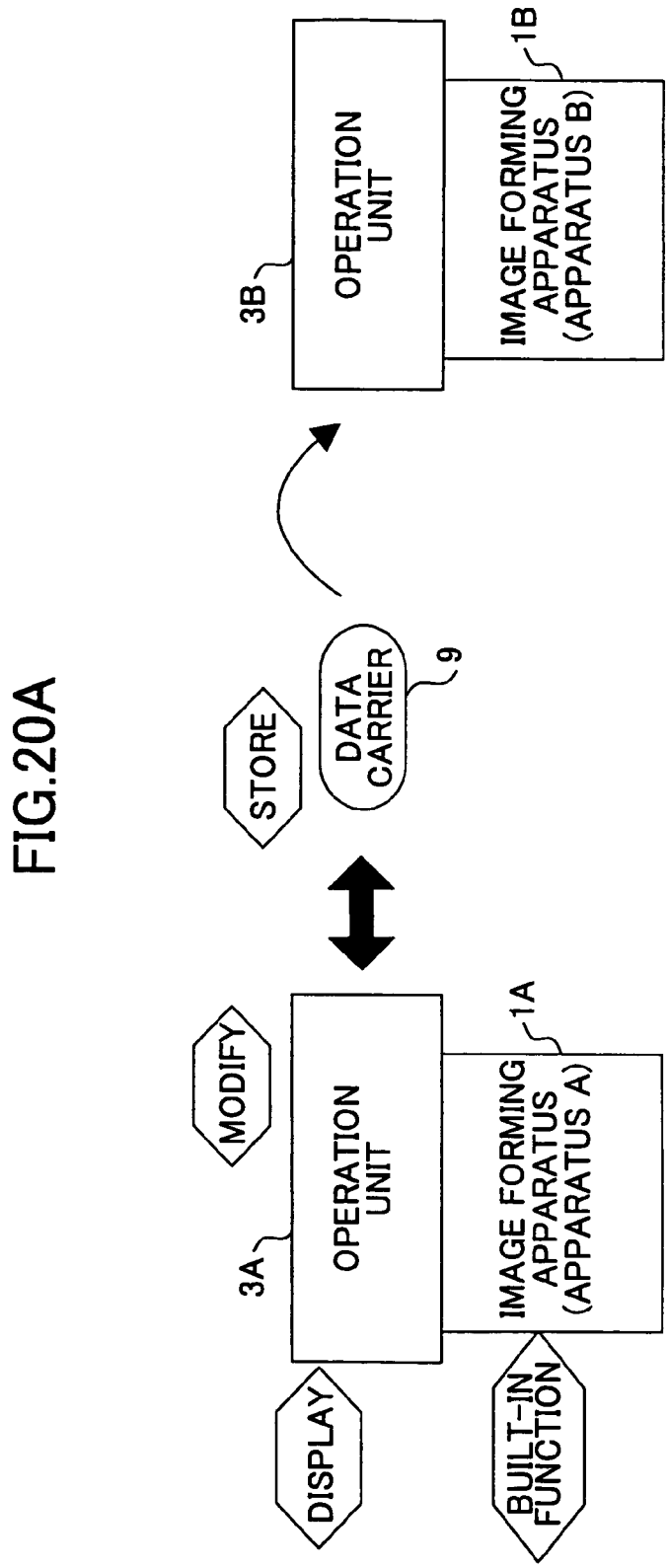

FIGS. 20A through 20C are illustrative drawings showing the outline of editing of the data carrier 9. FIG. 20A shows a case in which the data carrier 9 is edited by using an operation unit 3A of an image forming apparatus 1A. In this case, the data carrier 9 edited in this manner is usable at another image forming apparatus 1B.

FIG. 20B illustrates a case in which the data carrier 9 is edited by using information stored in the image forming apparatus 1A by accessing the image forming apparatus 1A through the external network 7 from the personal computer 84. The data carrier 9 edited in this manner is usable at another image forming apparatus 1B. Writing of data to the data carrier 9 may be achieved by using a data writing device attached to the personal computer 84, or may be achieved by using the operation unit of the image forming apparatus 1A.

FIG. 20C illustrates a case in which the data carrier 9 is edited by using information about an image forming apparatus stored in the Web site 86 by accessing the Web site 86 holding this information from the personal computer 84 through the external network 7. In this case, it is possible to edit an operation mode based on the functions of an image forming apparatus that does not exist at a local location.

Figure 21:
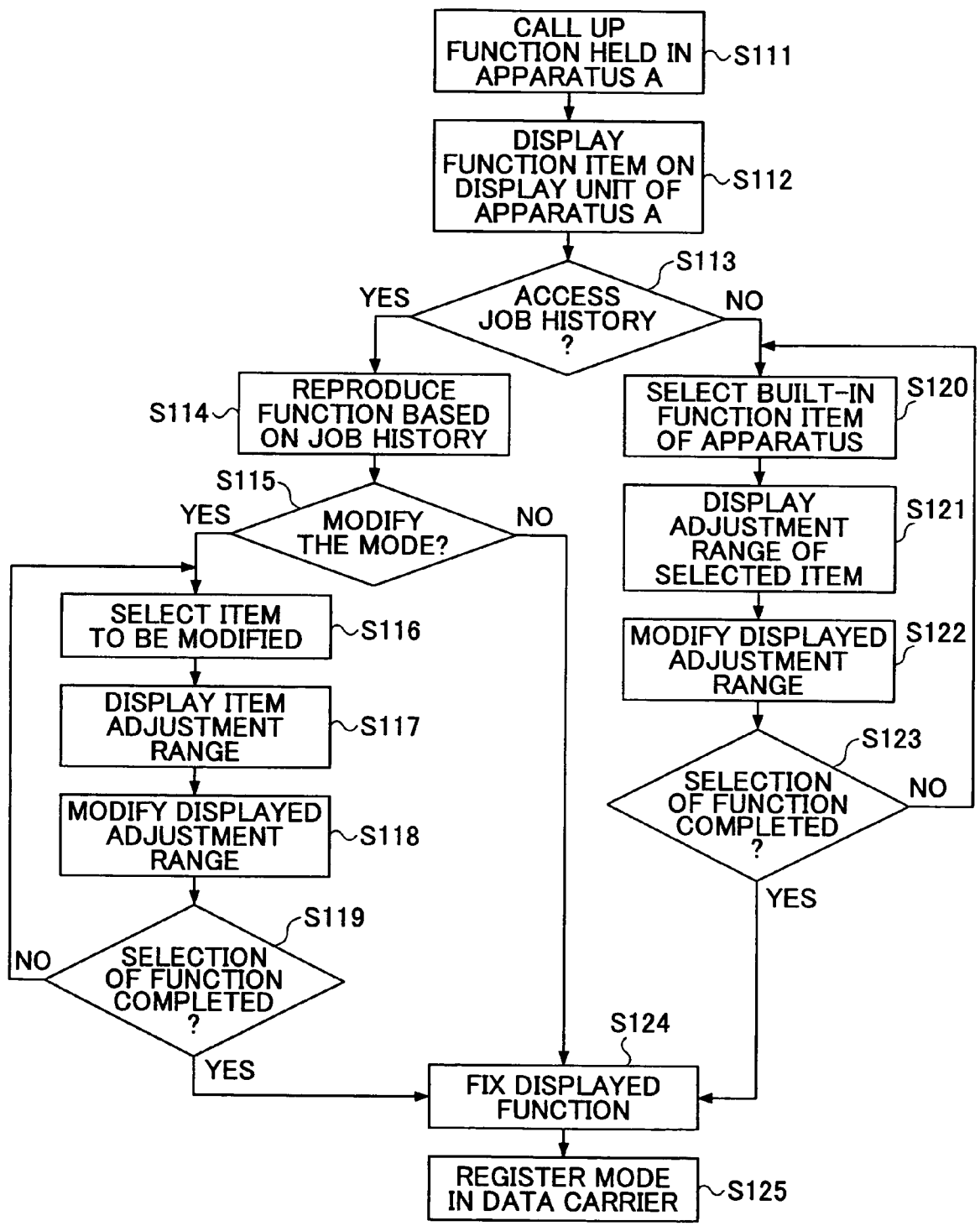
FIG. 21 is a flowchart showing a process of editing a data carrier by use of an image forming apparatus as shown in FIG. 20A.
Figure 22A:
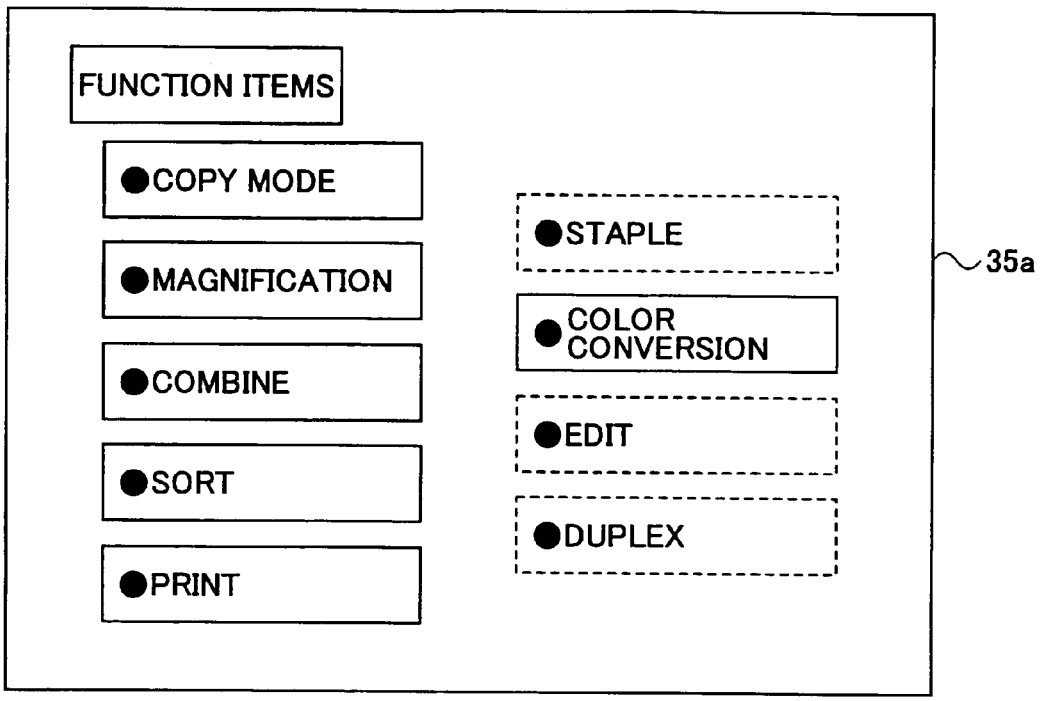
FIG. 22A is a drawing showing an example of function items displayed on the display unit.

FIG. 21 is a flowchart showing a process of editing a data carrier by use of an image forming apparatus as shown in FIG. 20A. In FIG. 21, the functions held by the apparatus A are called up (step S111), and the function items are displayed on the display unit 35 (step S112). FIG. 22A is a drawing showing an example of the function items displayed on the display unit 35.

Figure 22B:
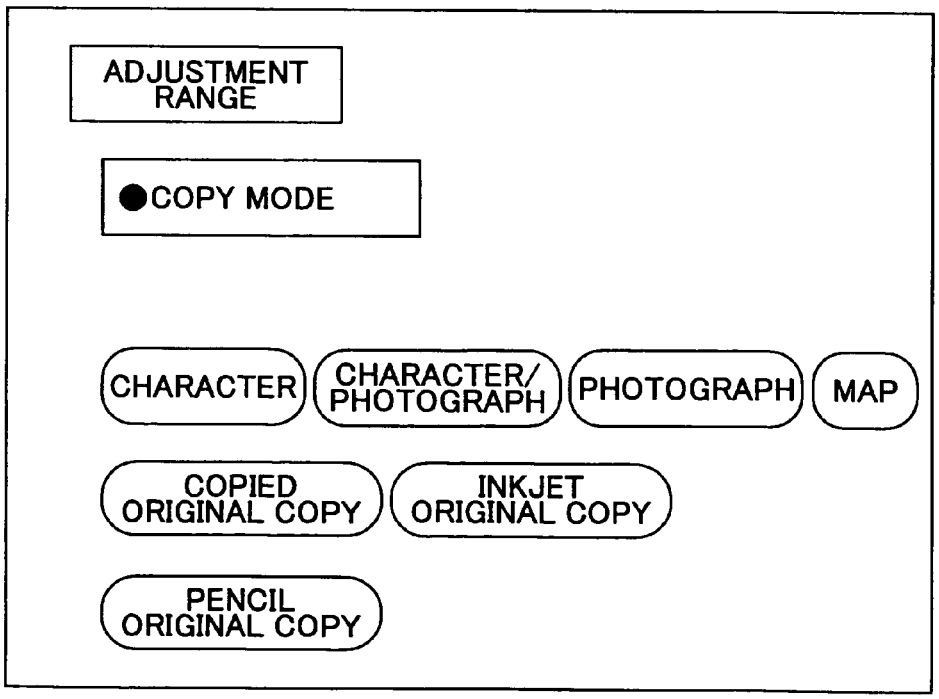
FIG. 22B is a drawing showing an example of an adjustment range displayed on the display unit.

After this, a check is made with the operator as to whether job history is to be referred to (step S113). If it is to be referred to (Yes at step S113), the functions relating to the job history are reproduced (step S114). A check is then made with the operator as to whether the operation mode is to be modified (step S115). If it is to be modified (Yes at step S115), the operator is prompted to select an item to be modified (step S116), followed by displaying a range of item adjustment (step S117). FIG. 22B is a drawing showing an example of the adjustment range displayed on the display unit 35.

Thereafter, the operator is let modify the displayed adjustment range (step S118). A check is then made as to whether the selection of functions is finished (step S119). If it is not finished, the procedure goes back to the selection of items to be modified (step S116).

If the job history is not to be referred to (No at step S113), the built-in function items of the apparatus are up for selection (step S120). An adjustment range of the selected item is then displayed (step S121). The operator is prompted to modify the displayed adjustment range (step S122). A check is made as to whether the selection of functions is finished (step S213). If it is not finished, the procedure goes back to the selection of function items (step S120).

If the operation mode is not to be modified (No at step S115) or if the selection of functions is finished (Yes at step S119 or S123), the displayed functions are fixed (step S124), which are then registered in the data carrier 9 (step S125).

Figure 23:
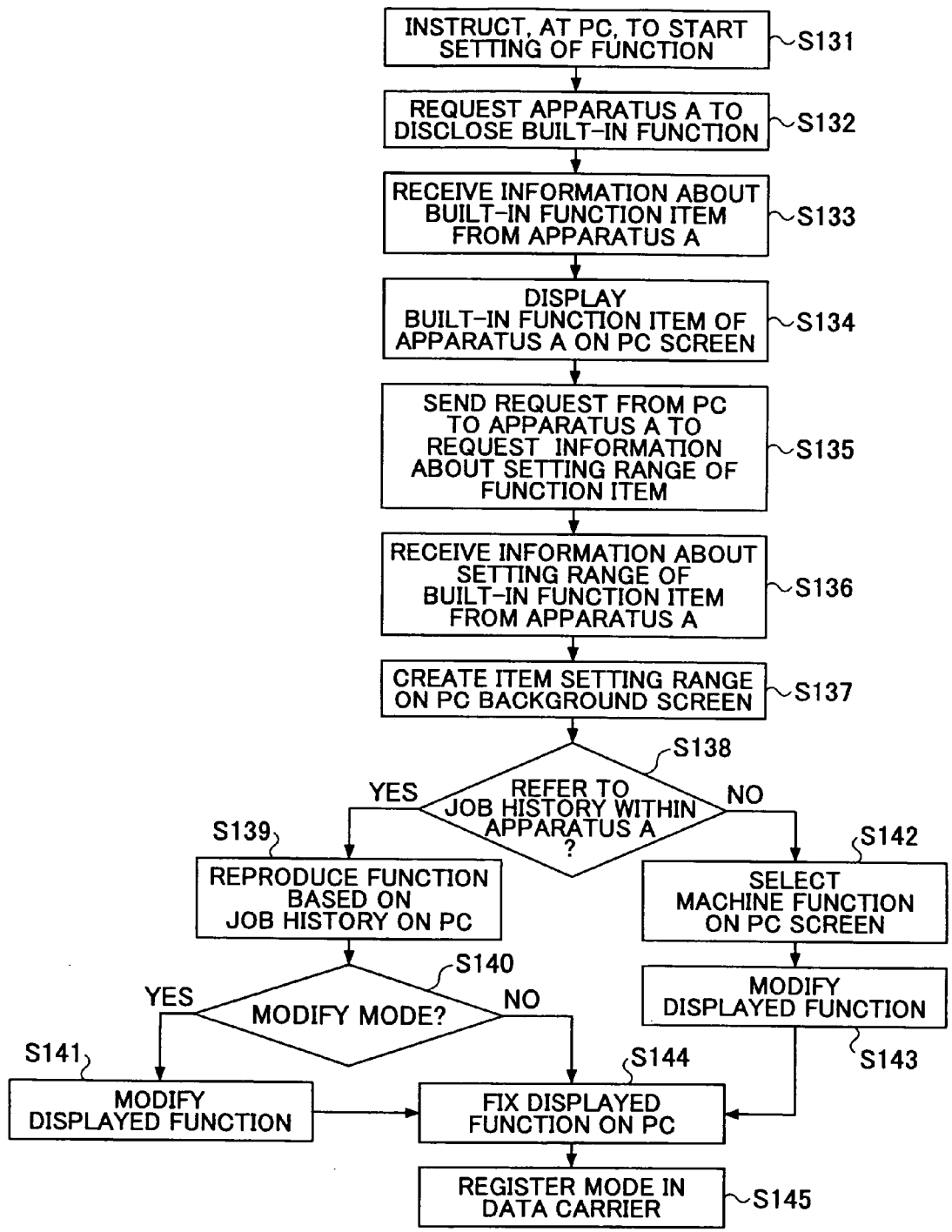
FIG. 23 is a flowchart showing a process of editing a data carrier by accessing an image forming apparatus from a personal computer as shown in FIG. 20B.
Figure 25A:
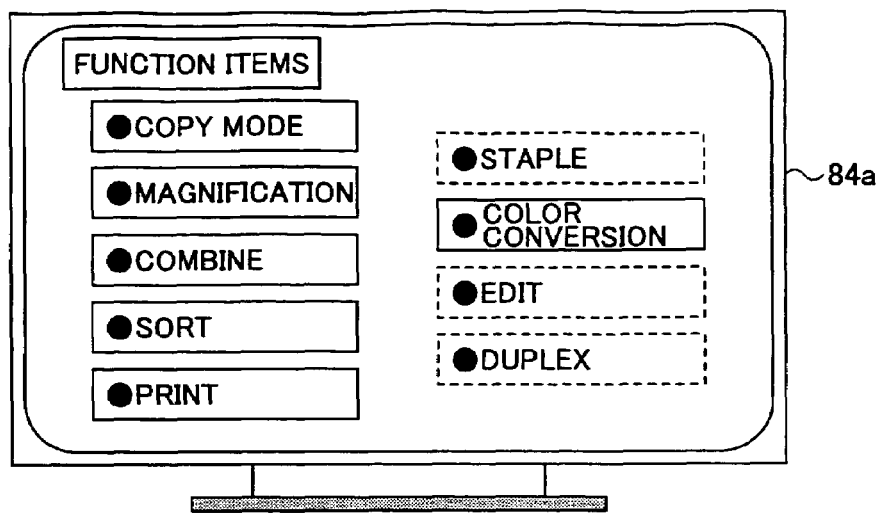
FIG. 25A is a drawing showing an example of built-in function items displayed on a display screen of the personal computer.

FIG. 23 is a flowchart showing a process of editing a data carrier by accessing an image forming apparatus from a personal computer as shown in FIG. 20B. In FIG. 23, the start of an operation for setting functions is ordered from the personal computer 84 (step S131). The apparatus A is requested to disclose information about the built-in functions (step S132). In response, the apparatus A transmits the built-in function item information, which is then received by the personal computer 84 (step S133). The personal computer 84 displays the built-in function items on the display screen (step S134). FIG. 25A is a drawing showing an example of the built-in function items displayed on a display screen 84a of the personal computer 84.

A request for information about a setting range of function items is then sent to the apparatus A (step S135). In response, the apparatus A transmits the function-item setting-range information, which is then received by the personal computer 84 (step S136). The item setting range is created on the background screen (step S137).

Figure 25B:
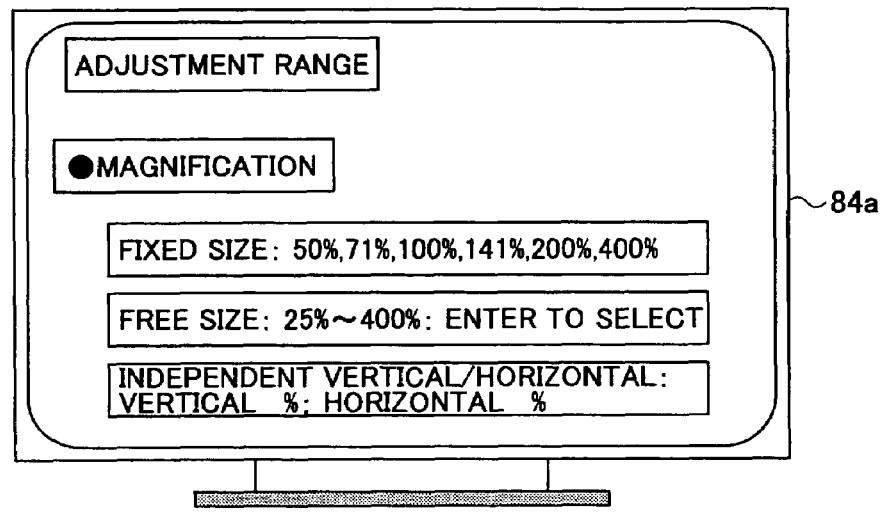
FIG. 25B is a drawing showing an example of an adjustment range displayed on the display screen of the personal computer.

After this, a check is made with the operator as to whether job history in the apparatus A is to be referred to (step S138). If it is to be referred to (Yes at step S138), the functions relating to the job history are reproduced at the personal computer 84 (step S139). A check is then made with the operator as to whether the operation mode is to be modified (step S140). If it is to be modified (Yes at step S140), the operator is prompted to modify the displayed functions (step S141). FIG. 25B is a drawing showing an example of the adjustment range displayed on the display screen 84a of the personal computer 84.

If the job history is not to be referred to (No at step S138), the operator is prompted to select the functions of the apparatus on the display screen (step S142) and to modify the displayed functions (step S143).

If the operation mode is not to be modified (No at step S140) or if modification is made (step S141 or S143), the displayed functions are fixed (step S144), which are then registered in the data carrier 9 (step S145).

Figure 24:
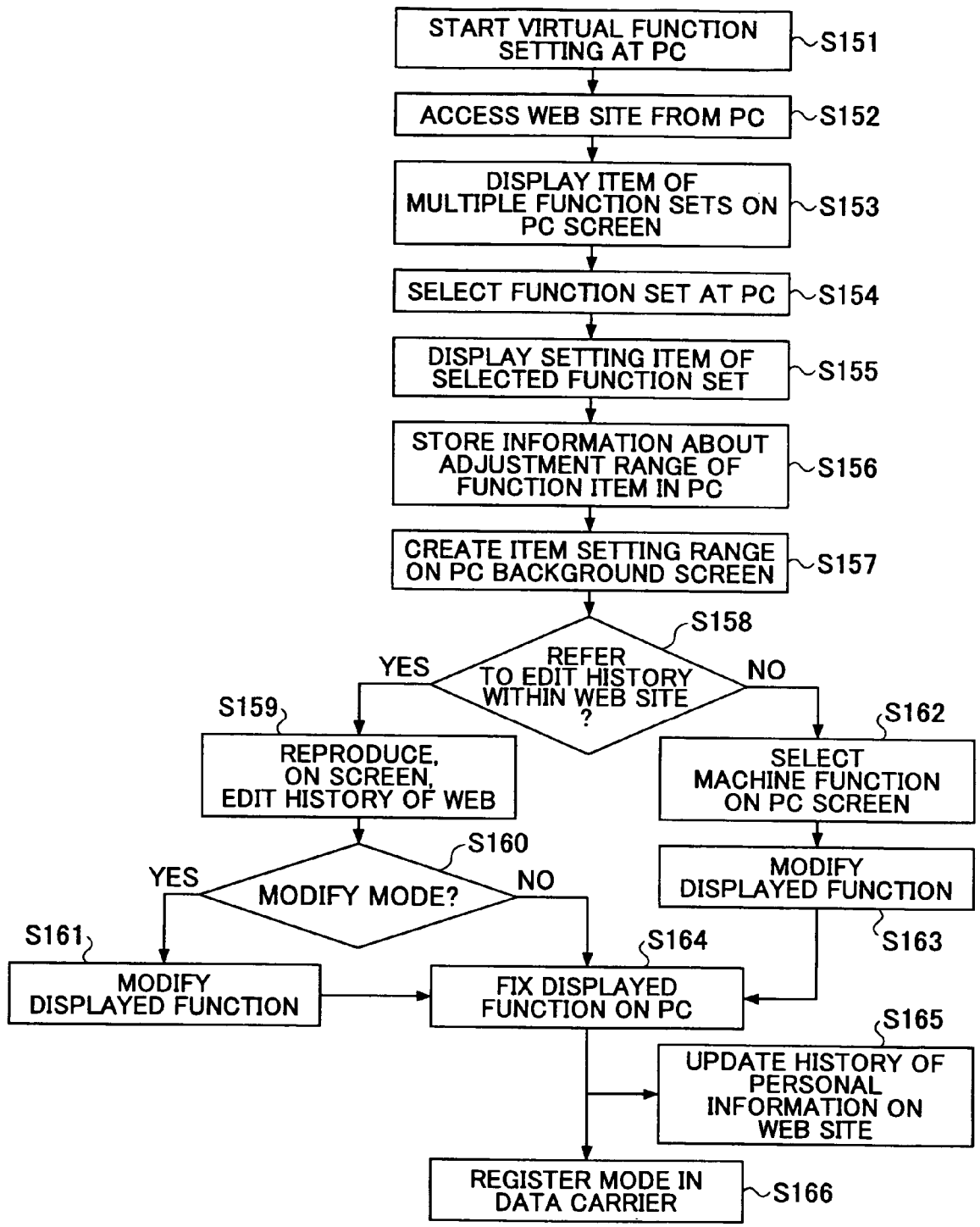
FIG. 24 is a flowchart showing a process of editing a data carrier by accessing a Web site from a personal computer as shown in FIG. 20C.
Figure 25C:
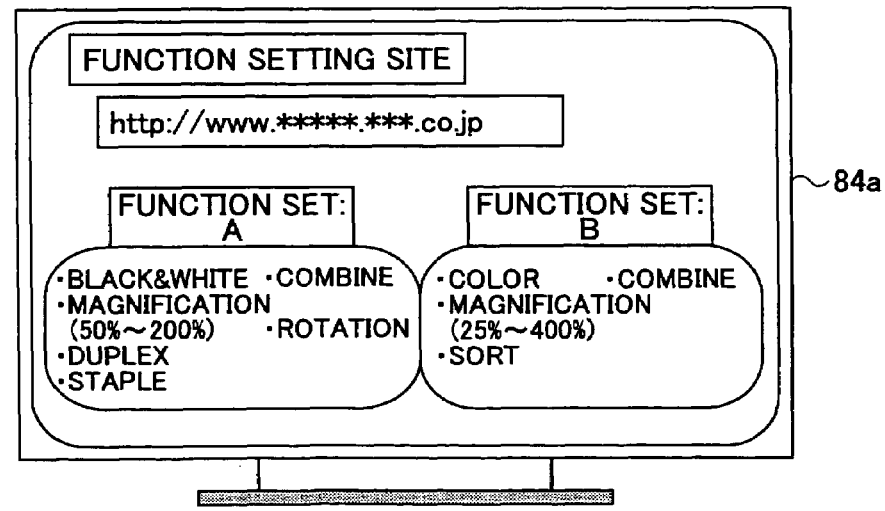
FIG. 25C is a drawing showing an example of items of a plurality of function sets displayed on the display screen of the personal computer.

FIG. 24 is a flowchart showing a process of editing a data carrier by accessing a Web site from a personal computer as shown in FIG. 20C. In FIG. 24, the setting of a virtual function starts at the personal computer 84 (step S151). The personal computer 84 accesses the Web site 86 (step S152), and displays items of a plurality of function sets obtained from the Web site 86 (step S153). FIG. 25C illustrates an example of items of a plurality of function sets displayed on the display screen 84a of the personal computer 84.

The operator is then prompted to select a function set at the personal computer 84 (step S154), and the setting items of the selected function set are displayed on the screen (step S155). Thereafter, information about the adjustment range of the function items is stored in the personal computer 84 (step S156), and the ranges of item settings are generated on the background screen (step S157).

A check is made with the operator as to whether the history of editing in the Web site 86 should be referred to (step S158). If it should be referred to (Yes at step S158), the history of editing is reproduced on the screen (step S159). A check is then made with the operator as to whether the operation mode is to be modified (S160). If it is to be modified (Yes at step S160), the operator is let modify the displayed functions (step S161).

If the history of editing is not referred to (No at step S158), the operator is prompted to select an apparatus function on the screen (step S162) and to modify the displayed function (step S163).

If the operation mode is not to be modified (No at step S160), or if modification is made (step S161 or S163), the displayed functions are fixed (step S164), followed by updating the history in the Web site 86 (step S165), and then registering the mode in the data carrier 9 (step S166).

Figure 26A:
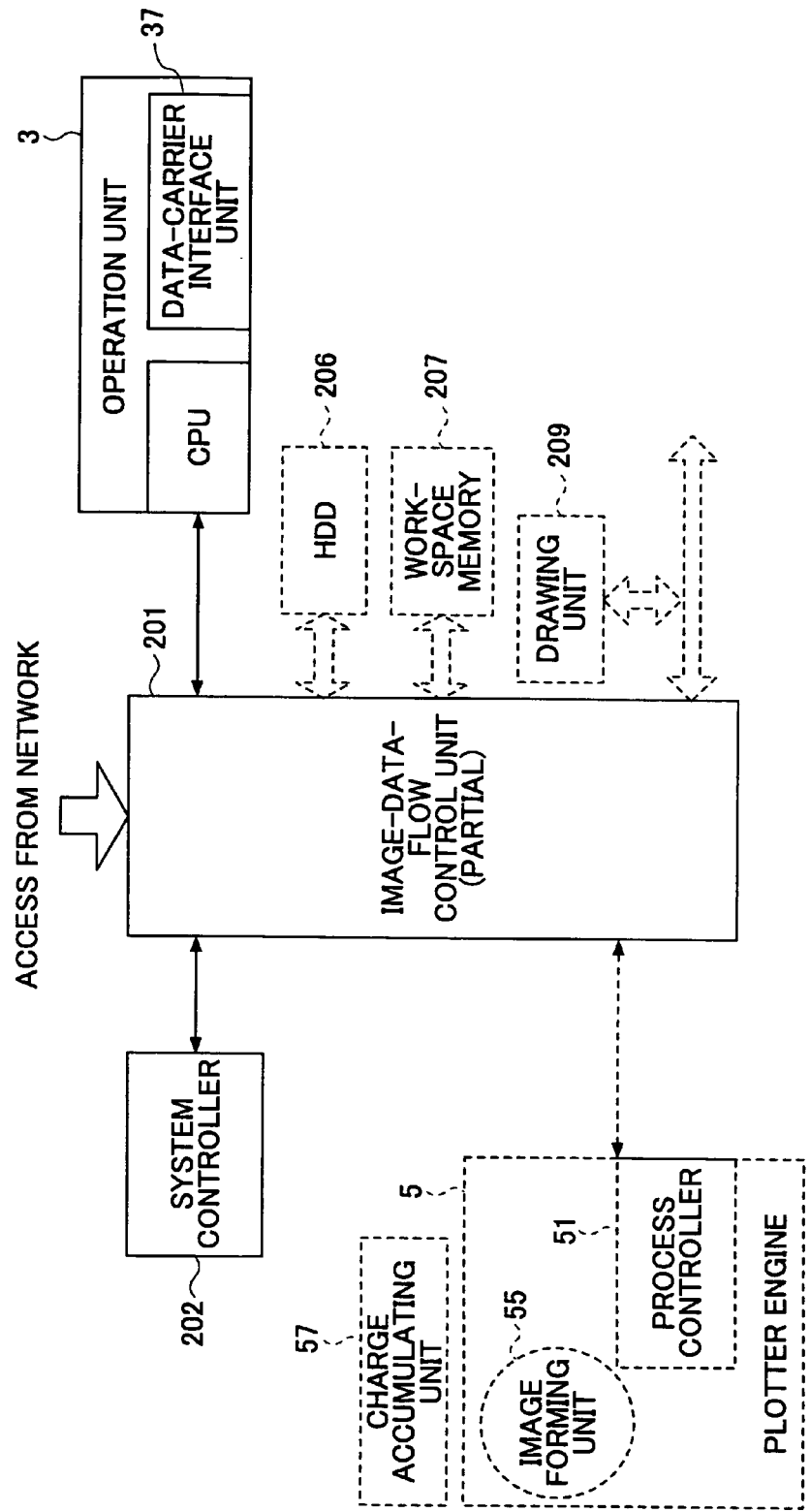
FIGS. 26A through 26C are drawings showing the outline of control of an energy saving mode based on the data carrier.
Figure 26B:
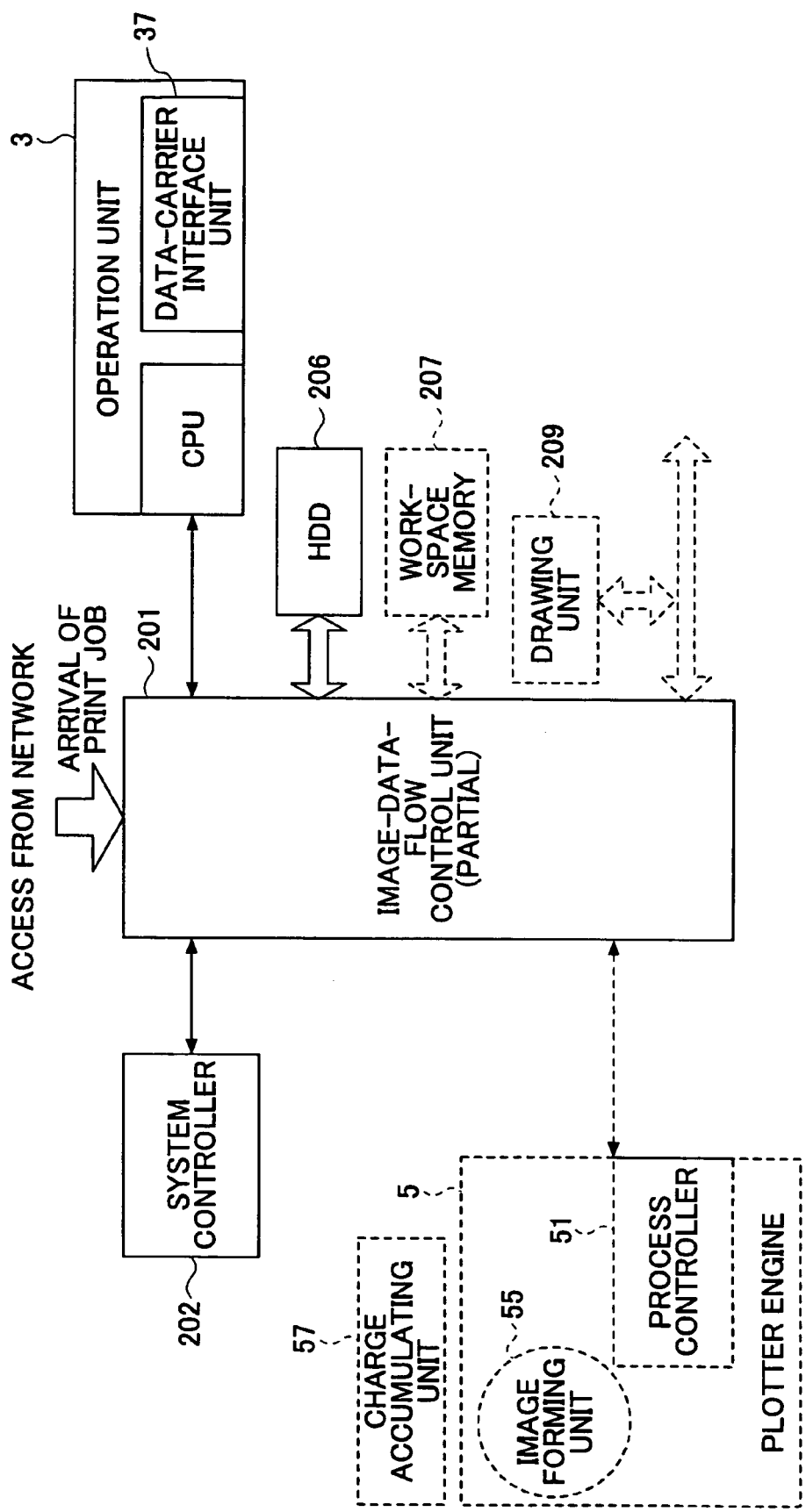
Figure 26C:
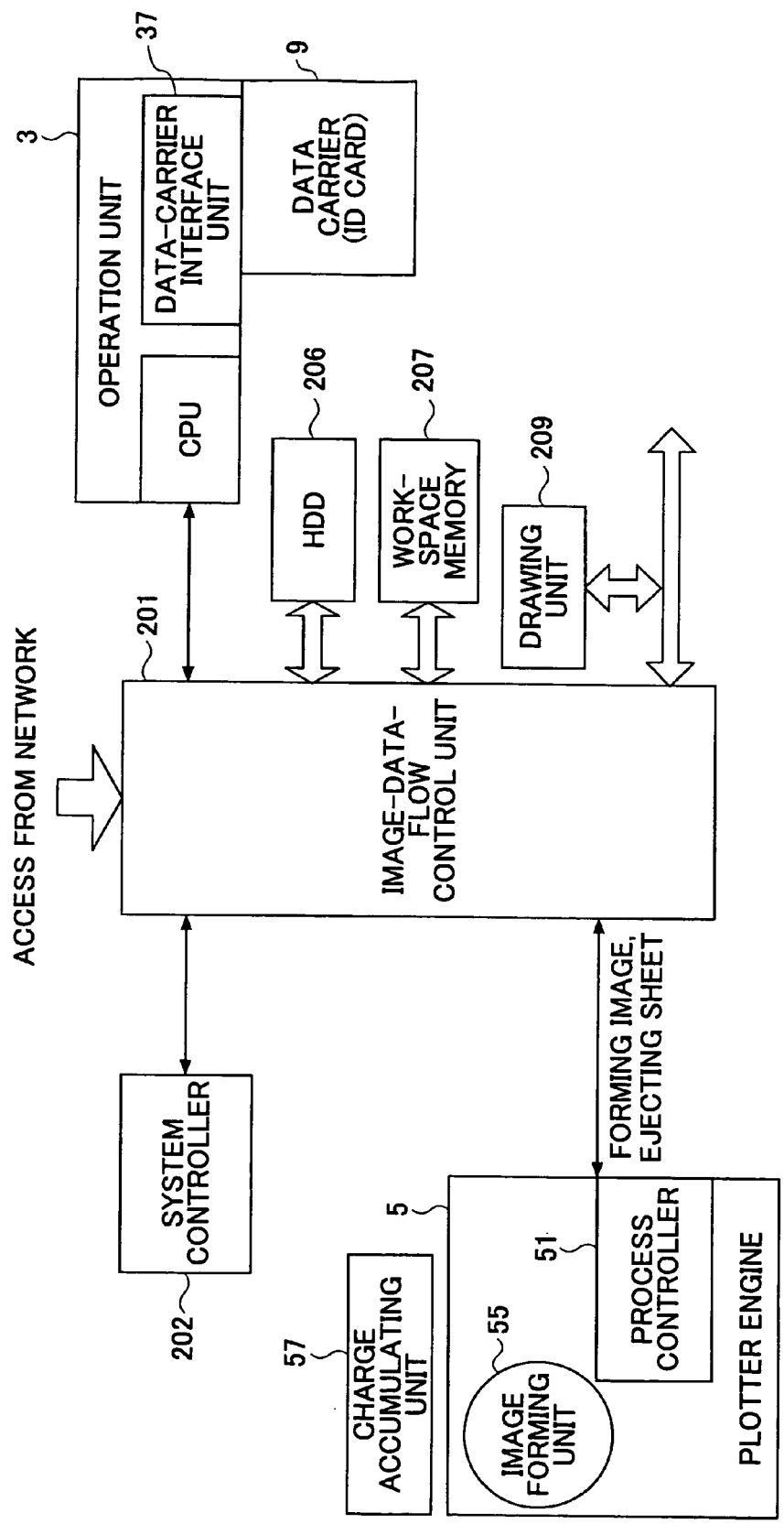

FIGS. 26A through 26C are drawings showing the outline of control of an energy saving mode (power-save mode) based on the data carrier 9. It is desirable to continue an energy saving mode as long as possible in order to produce a full effect of energy saving. If the apparatus cannot be used when the operator needs to use it, however, convenience is sacrificed. In consideration of this, when a print job or the like is received through a network, only a minimum necessary portion for the storage of received data and the like is activated.

Provision is also made to exit from the energy saving mode when the operator sets the data carrier 9 to the operation unit 3. In order to achieve a fast recovery from an energy saving mode, further, the accumulated charge of the charge accumulating unit 57 is discharged to warm up the fuser system rapidly, thereby promptly making the apparatus ready for printing.

FIG. 26A illustrates the standby state that corresponds to an energy saving mode. In this state, provision is made to accept commands from the operator and also to accept a print job through the network. To this end, the operation unit 3, part of image-data-flow control unit 201 of the system control unit 2, and the system controller 202 are supplied with power whereas other units such as the HDD 206, the work-space memory 207, the drawing unit 209, and the plotter engine 5 are not provided with power.

FIG. 26B illustrates a state observed when a print job is accepted. In addition to the state shown in FIG. 26A, the HDD 206 is supplied with power in order to store the received data.

FIG. 26C illustrates a state observed when the operator sets the data carrier 9 to the data-carrier interface unit 37 of the operation unit 3. The operator is identified based on the information contents of the data carrier 9. A match between the operator and a person issued the print job already stored in the HDD 206 (such a person may be identified by checking an ID obtained by the data input driver) is checked. After this checking, these portions which were not supplied with power are now activated in response to the instruction from the operation unit 3. Further, the charge accumulating unit 57 discharges accumulated charge in the plotter engine 5, thereby warming up the fuser system rapidly to make the apparatus promptly ready for printing.

Figure 27:
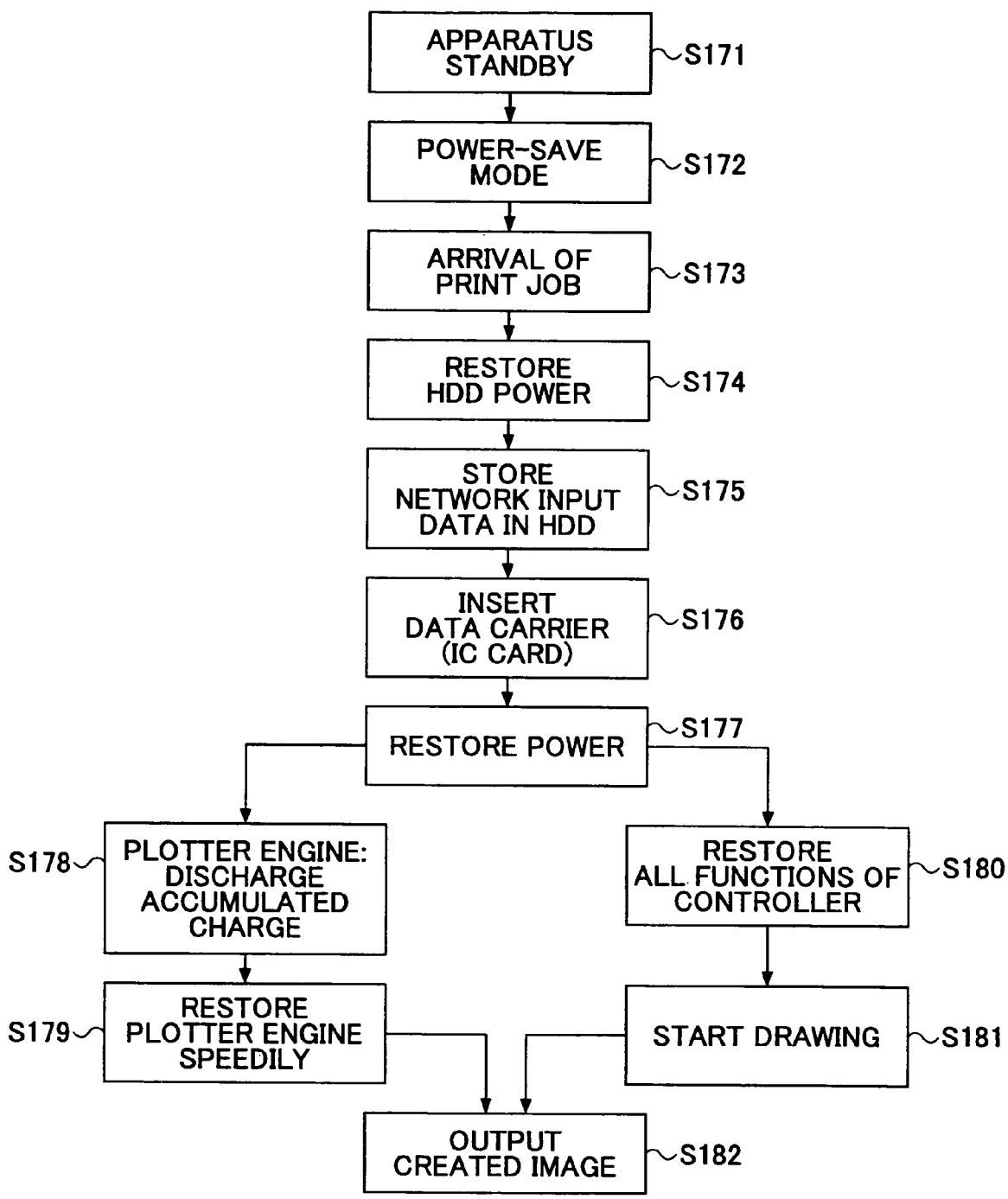
FIG. 27 is a flowchart showing a process of controlling an energy saving mode.

FIG. 27 is a flowchart showing a process of controlling an energy saving mode as described above. In FIG. 27, the apparatus enters into a standby state (step S171). After passage of a predetermined time period or the like, a power-save mode is activated (step S172). In this state, only a minimum necessary portion is supplied with power so as to accept commands from the operator and to accept a print job through a network.

When a print job arrives through a network (step S173), power to the HDD 206 is turned on (step S174). The data received from the network is stored in the HDD 206 (step S175).

Thereafter, the operator inserts the data carrier 9 into the operation unit 3 (step S176). In response, the operator is identified based on the information contents of the data carrier 9. A match between the operator and a person issued the print job already stored in the HDD 206 is checked. After this checking, power to all the portions is restored (step S177). The charge accumulating unit 57 then discharges accumulated charge in the plotter engine 5 (step S178), thereby speedily recovering the plotter engine 5 (step S179). All the functions of the controller are also restored (step S180). The drawing unit 209 starts drawing (step S181), and images are output at the image forming unit 55 of the plotter engine 5 (step S182).

Figure 28A:
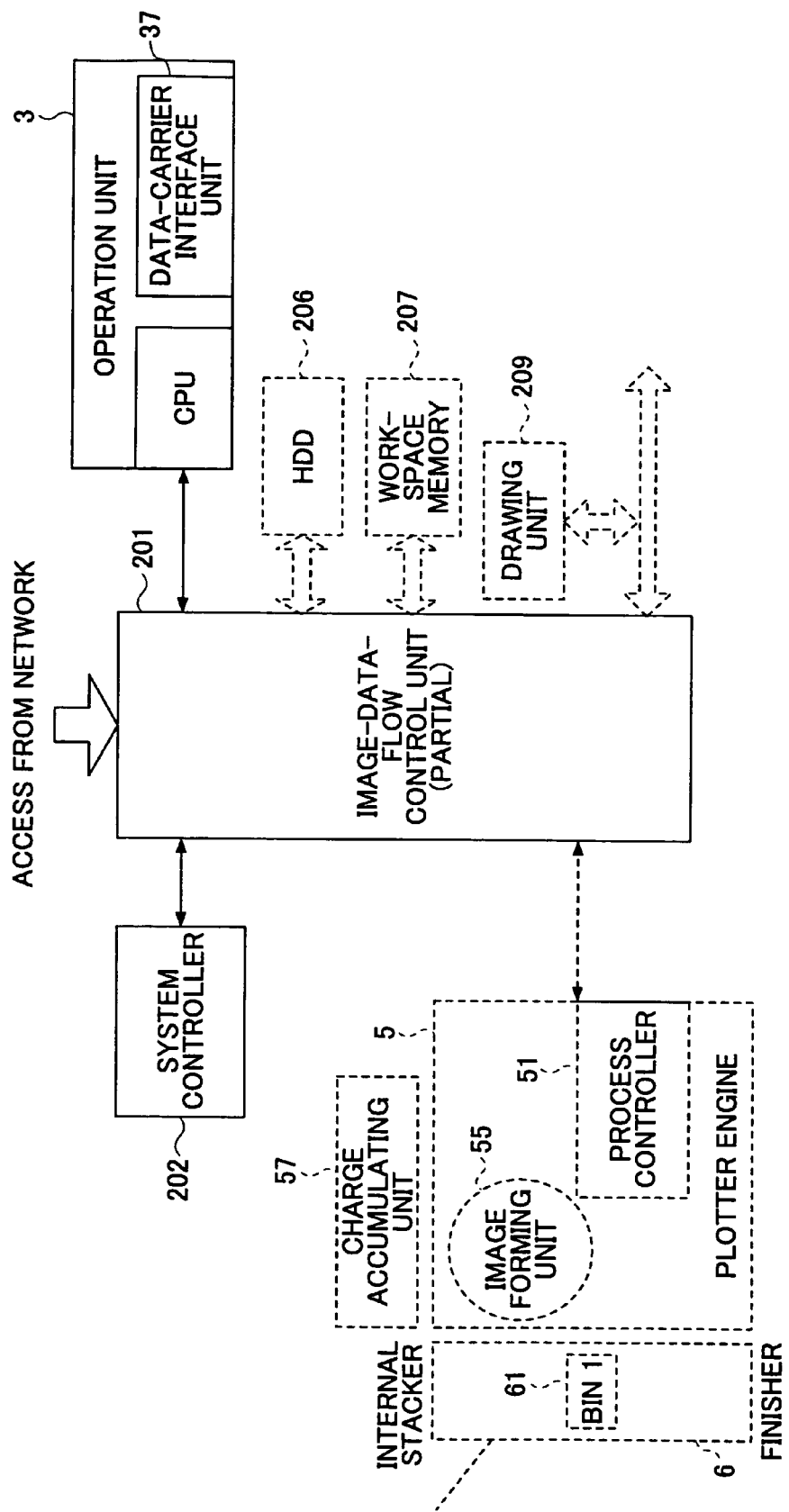
Figure 28C:
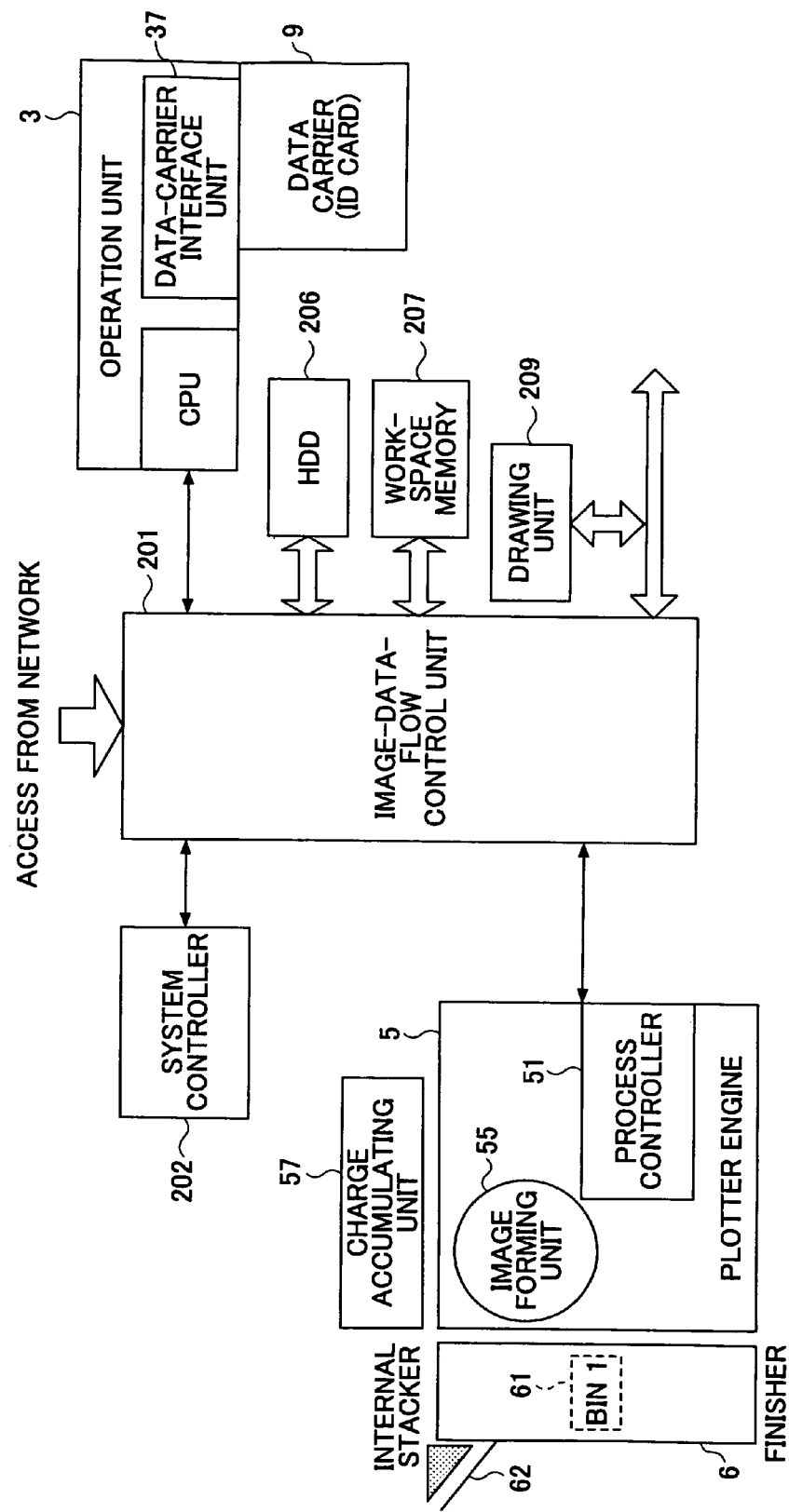

FIGS. 28A through 28C are drawings showing the outline of another example of control of an energy saving mode based on the data carrier. In this example, all the functions are restored to carry out printing when a print job is received in an energy saving mode. The printed sheets are then stored in a bin of the internal stacker 61 of the finisher 6, followed by a return to the energy saving mode. When the operator sets the data carrier 9 in the operation unit 3, a full recovery from the energy saving mode is made. In order to speed up a recovery from the energy saving mode, the charge accumulating unit 57 discharges accumulated charge so as to warm up the fuser system rapidly, thereby promptly bringing the apparatus to a state ready for printing.

FIG. 28A illustrates the standby state that corresponds to an energy saving mode. In this state, provision is made to accept commands from the operator and also to accept a print job through the network. To this end, the operation unit 3, part of image-data-flow control unit 201 of the system control unit 2, and the system controller 202 are supplied with power whereas other units such as the HDD 206, the work-space memory 207, the drawing unit 209, the plotter engine 5, and the finisher 6 are not provided with power.

FIG. 26B illustrates a state observed when a print job is accepted through the network. Units that were not supplied with power are now activated. Further, the charge accumulating unit 57 discharges accumulated charge in the plotter engine 5, thereby speedily warming up the fuser system so as to bring the apparatus rapidly to a state ready for printing. Printing is then carried out, and the printed sheets are stored in a bin of the internal stacker 61 of the finisher 6. Thereafter, transition is made to enter into the energy saving mode again as shown in FIG. 28A.

FIG. 26C illustrates a state observed when the operator sets the data carrier 9 to the data-carrier interface unit 37 of the operation unit 3. The operator is identified based on the information contents of the data carrier 9. After this, each unit that was not supplied with power is activated in response to the instruction from the operation unit 3. The print sheets that are printed and stored according to the print job requested by the operator are then conveyed from the internal stacker 61 of the finisher 6 to the sheet-ejection tray 62. Alternatively, only the finisher 6 may be recovered when the data carrier 9 is set in the operation unit 3, with the remaining units being left without power. When a full recovery to the state ready for printing is made in response to the setting of the data carrier 9 in the operation unit 3, the charge accumulating unit 57 may discharge accumulated charge in the plotter engine 5, thereby speedily warming up the fuser system to make the apparatus promptly ready for printing.

Figure 29:
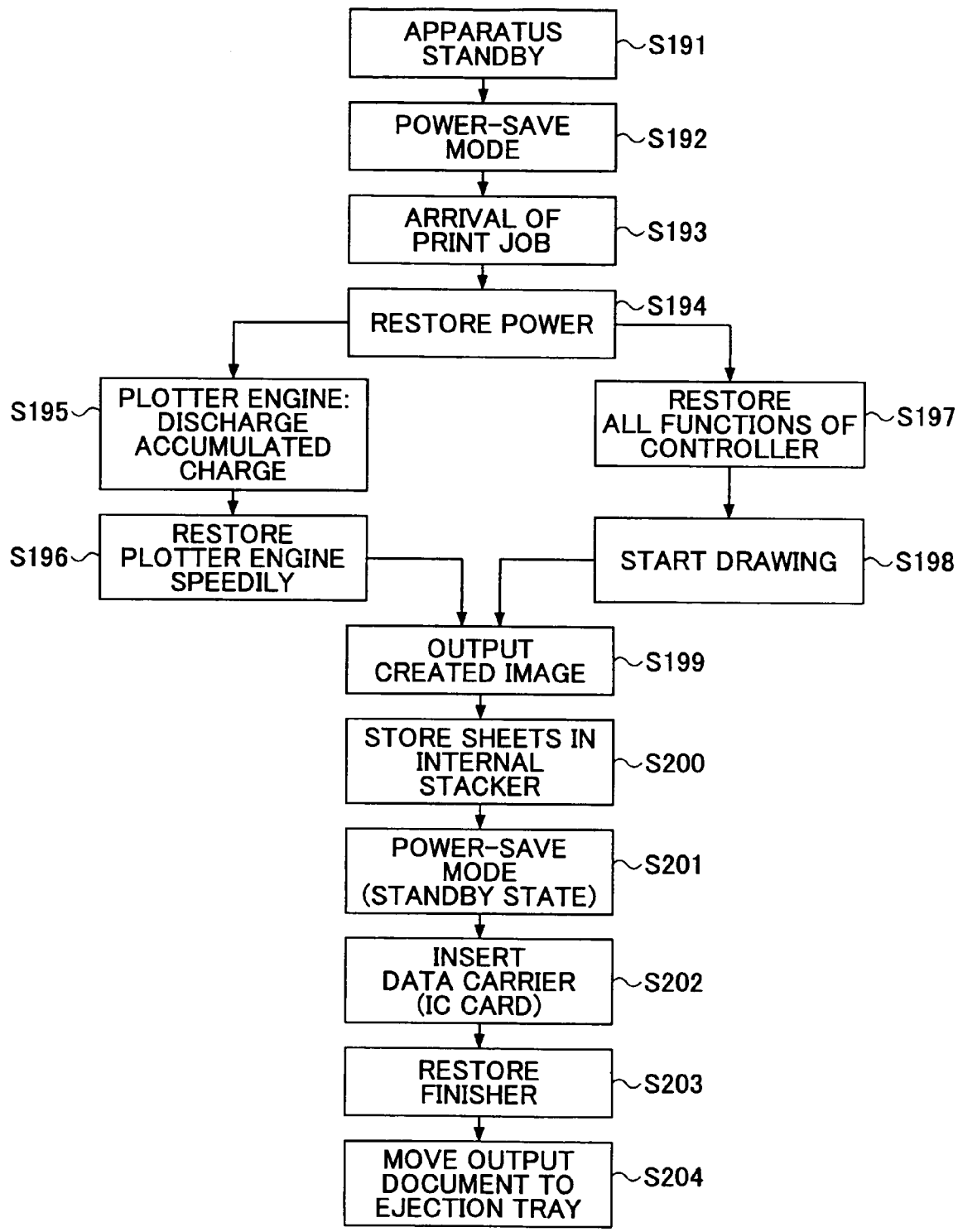
FIG. 29 is a flowchart showing a process of controlling an energy saving mode.

FIG. 29 is a flowchart showing a process of controlling an energy saving mode as described above. In FIG. 29, the apparatus enters into a standby state (step S191). After passage of a predetermined time period or the like, a power-save mode is activated (step S192). In this state, only a minimum necessary portion is supplied with power so as to accept commands from the operator and to accept a print job through a network.

When a print job arrives through a network (step S193), power to all the units is turned on (step S194). The charge accumulating unit 57 discharges accumulated charge in the plotter engine 5 (step S195), thereby speedily recovering the plotter engine 5 (step S196). All the functions of the controller are also restored (step S197). The drawing unit 209 starts drawing (step S198), and images are output at the image forming unit 55 of the plotter engine 5 (step S199). The printed sheets are then stored in the internal stacker 61 of the finisher 6 (step S200), followed by a return to the power-save mode (step S201).

When the operator thereafter inserts the data carrier 9 in the operation unit 3 (step s202), the operator is identified based on the information contents of the data carrier 9, followed by restoring the finisher 6 (step S203). The print sheets that are printed and stored according to the print job requested by the operator are then moved to the sheet-ejection tray 62 (step S204). Only the printouts corresponding to the operator's print job are accessible to be taken out, which ensures the security of the documents. Further, taking out on a job-by-job basis is achieved, thereby preventing various printouts to be mixed up with each other.

Figure 30:
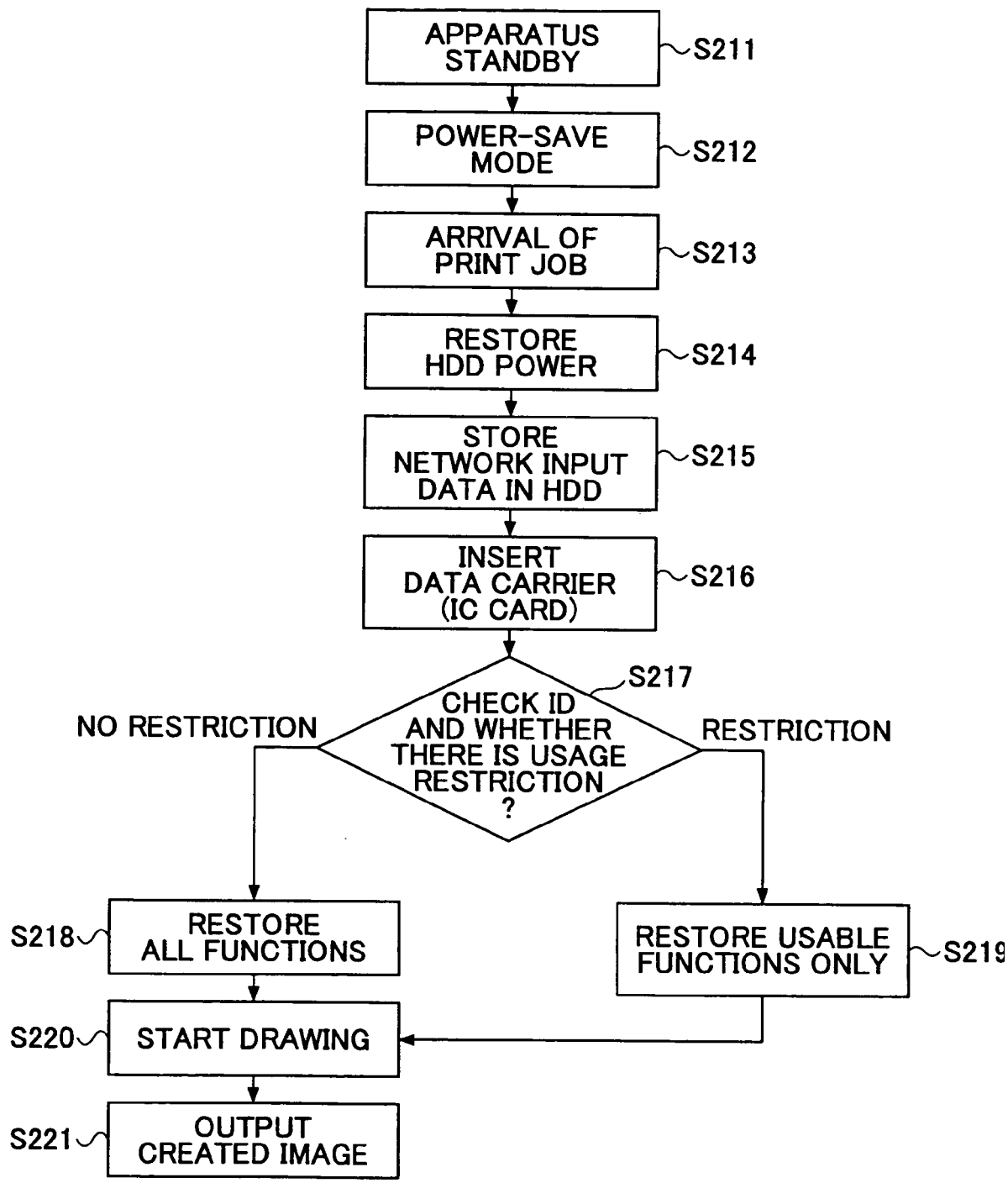
FIG. 30 is a flowchart showing another example of control of an energy saving mode.

FIG. 30 is a flowchart showing another example of control of an energy saving mode. This example is designed to enhance an energy saving effect by recovering only the required functions when usage limitations are imposed according to the position of the operator or the like. In FIG. 30, the apparatus enters into a standby state (step S211). After passage of a predetermined time period or the like, a power-save mode is activated (step S212). In this state, only a minimum necessary portion is supplied with power so as to accept commands from the operator and to accept a print job through a network.

When a print job arrives through a network (step S213), power to the HDD 206 is turned on (step S214). The data received from the network is stored in the HDD 206 (step S215).

Thereafter, the operator inserts the data carrier 9 into the operation unit 3 (step S216). In response, the operator is identified based on the information contents of the data carrier 9. A match between the operator and a person issued the print job already stored in the HDD 206 is checked. Further, a check is made as to whether a usage restriction is imposed according to the position of the operator or the like (step S217). If the ID is confirmed and the usage restriction is not imposed, power to all the portions in the engine unit and controller unit is restored (step S218). The drawing unit 209 starts drawing (step S220), and images are output at the image forming unit 55 of the plotter engine 5 (step S221). If the ID is confirmed but there is a usage restriction, only the portion relevant to the usable functions is activated with power (step S219). Then, drawing (step S220) and image outputting (step S221) are performed. If no right to print is conferred, neither drawing (step S220) nor image outputting (step S221) is performed.

Further, the present invention is not limited to these embodiments, but various variations and modifications may be made without departing from the scope of the present invention.

The present application is based on Japanese priority application No. 2004-149269 filed on May 19, 2004, with the Japan Patent Office, the entire contents of which are hereby incorporated by reference.

What is claimed is:

1. A method of controlling an energy saving mode in an image forming apparatus having functions provided by hardware resources used in an image forming process and programs for performing the image forming process, comprising:

entering the image forming apparatus into an energy saving mode in a standby state in which the image forming apparatus is not used and the functions are not available for use because power is not supplied to the hardware resources; and recovering only the functions of the image forming apparatus specified by a data carrier in response to the data carrier coupled to the image forming apparatus, said data carrier being in a possession of an operator and including operator-specific information indicative of language to be used for the operator and a list, specific to the operator, of at least some functions of the image forming apparatus.

2. The method as claimed in claim 1, wherein the data carrier is coupled to the image forming apparatus through an off-line connection.

3. The method as claimed in claim 1, wherein the data carrier is coupled to the image forming apparatus through a wireless connection.

4. The method as claimed in claim 1, wherein part of the functions for receiving a command and a job through a network is maintained in an activated state in the energy saving mode.

5. The method as claimed in claim 1, further comprising storing print data when receiving a print job.

6. The method as claimed in claim 5, further comprising recovering a hard disk drive from an inactive state to store the print data when receiving the print job.

7. The method as claimed in claim 5, further comprising recovering a print function to perform printing in response to the setting of the data carrier in the image forming apparatus.

8. The method as claimed in claim 7, further comprising discharging electric charge from a charge accumulating unit at a time of recovering the print function.

9. The method as claimed in claim 8, further comprising charging the charge accumulating unit while the image forming apparatus is in an activated state.

10. The method as claimed in claim 8, wherein the charge accumulating unit includes a condenser or a secondary battery.

11. The method as claimed in claim 1, further comprising: recovering a print function to perform printing when receiving a print job; and storing a printed sheet in storage such that the printed sheet is not accessible.

12. The method as claimed in claim 11, further comprising storing the printed sheet in an internal stacker.

13. The method as claimed in claim 12, wherein the internal stacker include a plurality of bins each serving as storage.

14. The method as claimed in claim 12, further comprising recovering a function of the internal stacker so as to allow the printed sheet to be accessible in response to the setting of the data carrier in the image forming apparatus.

15. The method as claimed in claim 11, further comprising allowing the printed sheet to be accessible in response to the setting of the data carrier in the image forming apparatus.

16. The method as claimed in claim 11, further comprising entering into the energy saving mode again after storing the printed sheet.

17. The method as claimed in claim 11, further comprising discharging electric charge from a charge accumulating unit at a time of recovering the print function.

18. The method as claimed in claim 17, further comprising charging the charge accumulating unit while the image forming apparatus is in an activated state.

19. The method as claimed in claim 17, wherein the charge accumulating unit includes a condenser or a secondary battery.

20. The method as claimed in claim 1, wherein said recovering recovers all the functions of the image forming apparatus in response to the setting of the data carrier in the image forming apparatus.

21. The method as claimed in claim 1, further comprising identifying the operator who possesses the data carrier based on an information content of the data carrier, wherein said recovering recovers only one or more of the functions usable according to usage right of the identified operator, the usage right based on usage history, usage limit, or information regarding the operator.

22. The method as claimed in claim 1, wherein the recovering includes recovering only a subset of the functions of the image forming apparatus as specified by the list included in the data carrier.

23. The method as claimed in claim 1, wherein recovering further includes displaying, on the image forming apparatus, a language included in the list in the data carrier.

24. An image forming apparatus having functions provided by hardware resources used in an image forming process and programs for performing the image forming process, comprising:
a unit configured to enter the image forming apparatus into an energy saving mode in a standby state in which the image forming apparatus is not used and the functions are not available for use because power is not supplied to the hardware resources; and
a recovery unit configured to recover only the functions of the image forming apparatus specified by a data carrier in response to the data carrier coupled to the image forming apparatus, said data carrier being in a possession of an operator and including operator-specific information indicative of language to be used for the operator and a list, specific to the operator, of at least some functions of the image forming apparatus.

25. The image forming apparatus as claimed in claim 24, wherein part of the functions for receiving a command and a job through a network is maintained in an activated state in the energy saving mode.

26. The image forming apparatus as claimed in claim 24, wherein print data is stored when receiving a print job.

27. The image forming apparatus as claimed in claim 26, wherein a hard disk drive is recovered from an inactive state to store the print data when receiving the print job.

28. The image forming apparatus as claimed in claim 26, wherein a print function is recovered to perform printing in response to the setting of the data carrier in the image forming apparatus.

29. The image forming apparatus as claimed in claim 28, further comprising a discharging unit configured to discharge electric charge from a charge accumulating unit at a time of recovering the print function.

30. The image forming apparatus as claimed in claim 29, wherein the charge accumulating unit is charged while the image forming apparatus is in an activated state.

31. The image forming apparatus as claimed in claim 29, wherein the charge accumulating unit includes a condenser or a secondary battery.

32. The image forming apparatus as claimed in claim 24, wherein a print function is recovered to perform printing when receiving a print job, and a printed sheet is stored in storage such that the printed sheet is not accessible.

33. The image forming apparatus as claimed in claim 32, wherein the printed sheet is stored in an internal stacker.

34. The image forming apparatus as claimed in claim 33, wherein the internal stacker include a plurality of bins each serving as storage.

35. The image forming apparatus as claimed in claim 33, wherein a function of the internal stacker is recovered so as to allow the printed sheet to be accessible in response to the setting of the data carrier in the image forming apparatus.

36. The image forming apparatus as claimed in claim 32, wherein the printed sheet becomes accessible in response to the setting of the data carrier in the image forming apparatus.

37. The image forming apparatus as claimed in claim 32, wherein the energy saving mode is activated again after storing the printed sheet.

38. The image forming apparatus as claimed in claim 32, wherein electric charge is discharged from a charge accumulating unit at a time of recovering the print function.

39. The image forming apparatus as claimed in claim 38, further comprising a charging unit configured to charge the charge accumulating unit while the image forming apparatus is in an activated state.

40. The image forming apparatus as claimed in claim 38, wherein the charge accumulating unit includes a condenser or a secondary battery.

41. The image forming apparatus as claimed in claim 24, wherein said recovery unit recovers all the functions of the image forming apparatus in response to the setting of the data carrier in the image forming apparatus.

42. The image forming apparatus as claimed in claim 24, wherein the operator who possesses the data carrier is identified based on an information content of the data carrier, wherein said recovery unit recovers only one or more of the functions usable according to usage right of the identified operator, the usage right based on usage history, usage limit, or information regarding the operator.

43. The image forming apparatus as claimed in claim 24, wherein the data carrier is coupled to the image forming apparatus through an off-line connection.

44. The image forming apparatus as claimed in claim 24, wherein the recovering unit is configured to recover only a subset of the functions of the image forming apparatus as specified by the list included in the data carrier.

45. The image forming apparatus as claimed in claim 24, wherein the data carrier is coupled to the image forming apparatus through a wireless connection.

46. The image forming apparatus as claimed in claim 24, wherein the recovery unit is further configured to display, on the image forming apparatus, a language included in the list in the data carrier.

* * * * *